(12) United States Patent
Raczkowski et al.

(10) Patent No.: US 11,295,113 B2
(45) Date of Patent: Apr. 5, 2022

(54) 3D BIOMETRIC IDENTIFICATION SYSTEM FOR IDENTIFYING ANIMALS

(71) Applicant: ID Lynx Ltd., Calgary (CA)

(72) Inventors: Christopher John Raczkowski, Chengdu (CN); Liwen Zhang, Chengdu (CN)

(73) Assignee: ID Lynx Ltd., Calgary (CA)

( * ) Notice: Subject to any disclaimer, the term of this patent is extended or adjusted under 35 U.S.C. 154(b) by 58 days.

(21) Appl. No.: 16/855,360

(22) Filed: Apr. 22, 2020

(65) Prior Publication Data

US 2020/0342207 A1 Oct. 29, 2020

Related U.S. Application Data

(60) Provisional application No. 62/838,781, filed on Apr. 25, 2019.

(51) Int. Cl.
*G06K 9/00* (2006.01)
*G06K 9/62* (2022.01)

(52) U.S. Cl.
CPC ....... *G06K 9/00214* (2013.01); *G06K 9/6215* (2013.01); *G06K 2209/21* (2013.01)

(58) Field of Classification Search
CPC .............. G06K 9/00214; G06K 9/6215; G06K 2209/21
USPC .......................................................... 382/103
See application file for complete search history.

(56) References Cited

U.S. PATENT DOCUMENTS

| 9,342,735 B2 | 5/2016 | Polimeno et al. |
| 9,875,391 B2 | 1/2018 | Liang et al. |
| 2010/0259546 A1* | 10/2010 | Yomdin .................... G06T 7/12 345/473 |
| 2011/0152676 A1* | 6/2011 | Groszmann .......... A61B 6/5235 600/426 |
| 2012/0062716 A1* | 3/2012 | Dillon .................... A61C 9/006 348/66 |
| 2014/0270543 A1* | 9/2014 | Zhang .................. H04N 5/2353 382/209 |
| 2019/0228571 A1* | 7/2019 | Atsmon ................ G06T 19/006 |
| 2019/0295319 A1* | 9/2019 | Pham .................... G06T 15/005 |

* cited by examiner

*Primary Examiner* — Michael R Neff
(74) *Attorney, Agent, or Firm* — ATMAC Patent Services Ltd.; Andrew T. MacMillan

(57) ABSTRACT

A system includes an identification system and an information database for linking an unidentified animal (UA) to a registered animal. A requester sends the media corresponding to the UA to the identification system. The UA images are used for determining an orientation and position of the UA. A selected 3DSM of the registered animal may be reconfigured using a 3DSM generator by moving the movable joints of the 3DSM to have the same orientation and position as the UA images. A 2DSM generator is used to generate 2D synthetic images (2DSIs) of the selected 3DSM. The images of the unidentified animal are compared to the 2DSIs of the selected 3DSM. When a match probability exceeds a threshold probability, a match is reported to a requester. The requester can obtain permission from an owner to get access to the information pertaining to the UA.

20 Claims, 20 Drawing Sheets

Section A: *3D Surface Model (3DSM) & 2D Synthetic Images (2DSIs)*
Step 1 – Baseline 3DSM and 2DSI Generation

3D BIOMETRIC IDENTIFICATION SYSTEM FOR IDENTIFYING ANIMALS

CROSS-REFERENCE TO RELATED APPLICATIONS

This application claims the benefit of priority of U.S. Provisional Application No. 62/838,781 filed Apr. 25, 2019, which is incorporated herein by reference.

BACKGROUND OF THE INVENTION

(1) Field of the Invention

The invention pertains generally to an identification system for identifying animals. More specifically, the invention relates to generating three-dimensional models of target animals and then adjusting movable parts of those models when attempting to match against incoming images of unidentified animals.

(2) Description of the Related Art

There are approximately 90 million pet dogs in the United States. The American Humane Association estimates one in three pets will become lost or stolen at some point in their lifetime. This can be an emotionally devasting experience for the owners as the return-to-owner rates tend to be quite low. One common solution is to microchip the dog, but these require specialized equipment and readers which are not available to a passer-by who may come across a lost animal. Another common approach is to use information collars which are tied around the neck; however, collars may fall-off or become difficult to read over time.

Another approach uses image recognition techniques for identifying animals. These techniques rely on digital photos of the animal or specific animal features (e.g. faces, iris' of horses or humans, back and fin markings on whales, etc.). The user takes an image of the animal during a registration process and interacts with the system to identify facial recognition markers such as nose and eyes, for example. The system then stores the images and information identifying the markers in the database. When someone comes across an unknown pet, they can take pictures of the unknown animal and upload them to a server. The server then attempts to determine a match with the registered pets.

However, these existing image recognition techniques rely on comparing two-dimensional pictures to match identifying markers. In the case the pictures are taken from the same angle and both show the same markers in similar positions, the results can be satisfactory; however, in the case the images stored by the pet owner have the animal in different positions or are taken from different angles than the pictures of the lost pet, the results are often less than satisfactory. Even when the same animal is present in both sets of pictures, if the picture angles and animal positions are different, the system may fail to detect a match.

BRIEF SUMMARY OF THE INVENTION

According to an exemplary embodiment of the invention there is disclosed an identification system that generates a three-dimensional model of a target object such as an animal. The model is generated with movable parts similar to the real life object and can therefore be dynamically configured by one or more computer processors to be in the same shape and orientation as an unidentified target object in an incoming image. A synthetic image is generated based on the model by essentially "taking a picture" of the model configured to have each of its movable parts positioned in the same way as the target object. The model can be iteratively improved for a particular object by comparing a synthetic image generated from the model with an incoming picture of the known object. A variance difference is utilized to automatically adjust the model and another synthetic picture of the adjusted model is taken. The process repeats until the synthetic image of the model matches the incoming image with a variance below a threshold. Likewise, a target object in an incoming image can be identified by categorizing the target object and then selecting various possible models of known objects of that category. The selected models have their moving parts and orientation configured to match the way the target object is shown in the incoming image and then a synthetic image of the configured model is compared with the incoming image. Assuming a match of low variance (below a threshold variance) is found when using a particular model, the target object is identified as the known object to which that model corresponds.

According to an exemplary embodiment of the invention there is disclosed an identification system for matching a model to a target object, the identification system includes one or more processors, a storage device, and a communication interface. By the one or more processors executing software instructions loaded from the storage device, the one or more processors are configured to receive an incoming image via the communication interface, identify the target object in the incoming image, determine a classification of the target object, retrieve the model of the target object based on the classification, select a movable part of the model, identify a configuration of a section of the target object in the incoming image that corresponds to the movable part of the model, configure the movable part of the model to match the configuration of the section of the target object in the incoming image, generate a synthetic image of the model with the movable part configured to match the section of the target object in the incoming image, and compare the synthetic image with the incoming image to determine whether the synthetic image matches the incoming image.

According to an exemplary embodiment of the invention there is disclosed an image data manipulation device including: (a) a computer system that receives and stores still and/or video images (the "Images") of an animal (where the "animal" is a member of the kingdom animalia), (b) a set of three dimensional ("3D") wireframe models that may be similar to the object, may be used to facilitate the 3DSM generation process, (c) if a wireframe model is used, machine learning ("ML") and computer generated imagery ("CGI") systems may resize a wireframe model to be similar to the unique proportions of the Object, (d) a ML, or other, system extracts features of an animal shown in an image, and overlays those features on the surface of a wireframe 3D model, (e) a ML+CGI system which can generate two dimensional synthetic images ("2DSIs") of the 3DSM, with the 3DSM in any possible posture/pose/condition, (f) a ML system that optimizes a 3DSM by comparing 2DSIs with new images of an animal, or by comparing a 3DSM with a new 3D model of the animal, and then generating adjusted 3DSMs and associated 2DSIs which have reduced variance with the new images or new 3D model of the animal, (g) a database for storing images, 3DSMs and 2DSIs of an animal for a plurality of uses.

According to an exemplary embodiment of the invention there is disclosed a system for generation of feature rich, biometrically accurate 3D surface models (the "3DSM"), and associated 2D synthetic images (the "2DSIs") which are derived from a 3DSM. A 3DSM is generated from digital still or video images of an animal (where the "animal" is any member from the kingdom animalia), and potentially using a generic 3D wireframe model as a basis for the 3DSM shape, utilizing machine learning ("ML") methods and computer graphic imagery (CGI) technology (or other methods outlined in the "3D Gen-gin" definition). Suitable ML and CGI technology products are readily available on the market or can be customized for use in a proprietary embodiment. The 3DSMs and 2DSIs have further utility when used for identification of animals, using other ML techniques for image recognition between 3DSMs, associated 2DSIs, and new images or 3D models of an animal that an individual might want to identify as being, or not being, within a set of existing 3DSMs.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
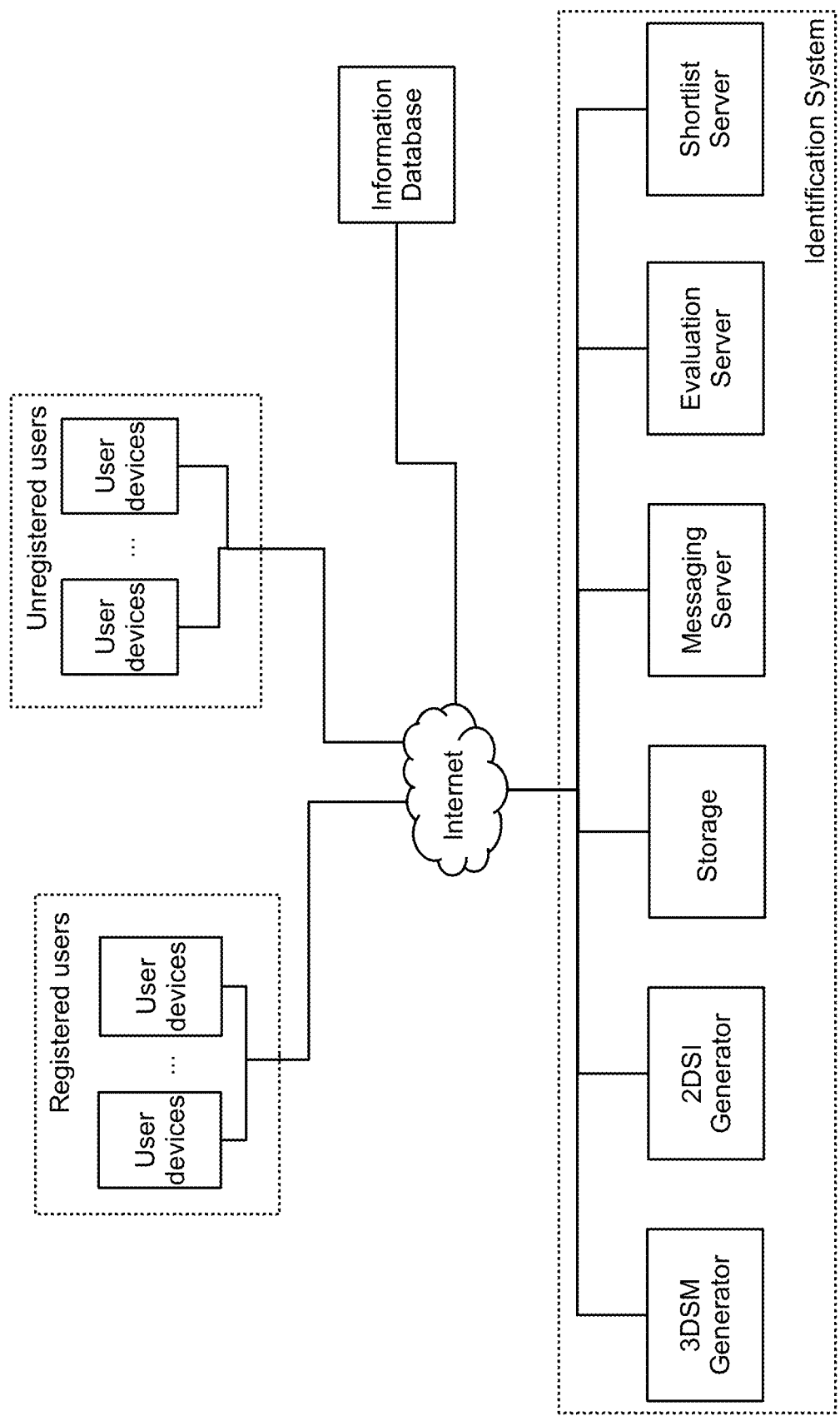
FIG. 1 shows a block diagram of a system for identifying animals according to an exemplary embodiment.

FIG. 1 shows a block diagram of a system for identifying objects such as animals according to an exemplary embodiment. The system comprises registered users, unregistered users, an information database, and an identification system, which are each coupled to one another via a computer network such as the Internet. The identification system includes a 3-dimensional surface model (3DSM) generator, a 2-dimensional synthetic image (2DSI) generator, a storage device, a messaging server, an evaluation server, and a shortlist server. The 3DSM generator, the 2DSI generator, the messaging server, the evaluation server, the storage device, and the shortlist server may be combined in a single identification system such as a single computer server or may be operated separately such as in a plurality of different computer servers in some embodiments.

Briefly described, the 3DSM generator produces a model, i.e., a 3DSM, of the target object using media data received from a user device. The 2DSI generator produces synthetic images, i.e., a 2DSIs, of the target object as rendered using the 3DSM model. The message server sends messages between the various components of FIG. 1 such as to the user devices when requested by the identification system or vice versa. The evaluation server compares incoming images of a target object with the 2DSIs generated by the 2DSI generator according to a particular model to determine a probability of match. Further, as described below with reference to FIG. 19, the evaluation server may also directly compare 3DSMs without utilizing intermediate synthetic images. The shortlist server creates a shortlist of the target objects registered with models in the information database for comparison to the images of an unidentified object. In some embodiments, the shortlist server uses characteristics of the unidentified object to create the shortlist.

Registered users include users that have registered target objects with the system. In this embodiment, the objects refer to animals; however, as will be explained further below, the system can in some embodiments be utilized to model and identify any desired type of object. Unregistered users are the remaining users that have not registered an animal but may wish to use the system for identifying unidentified animals. In an example use case, a registered user registers their pet dog with the system. An unregistered user may thereafter come across the lost pet dog and may use the system for determining the pet's identity and find the contact information for the pet owner.

Figure 2:
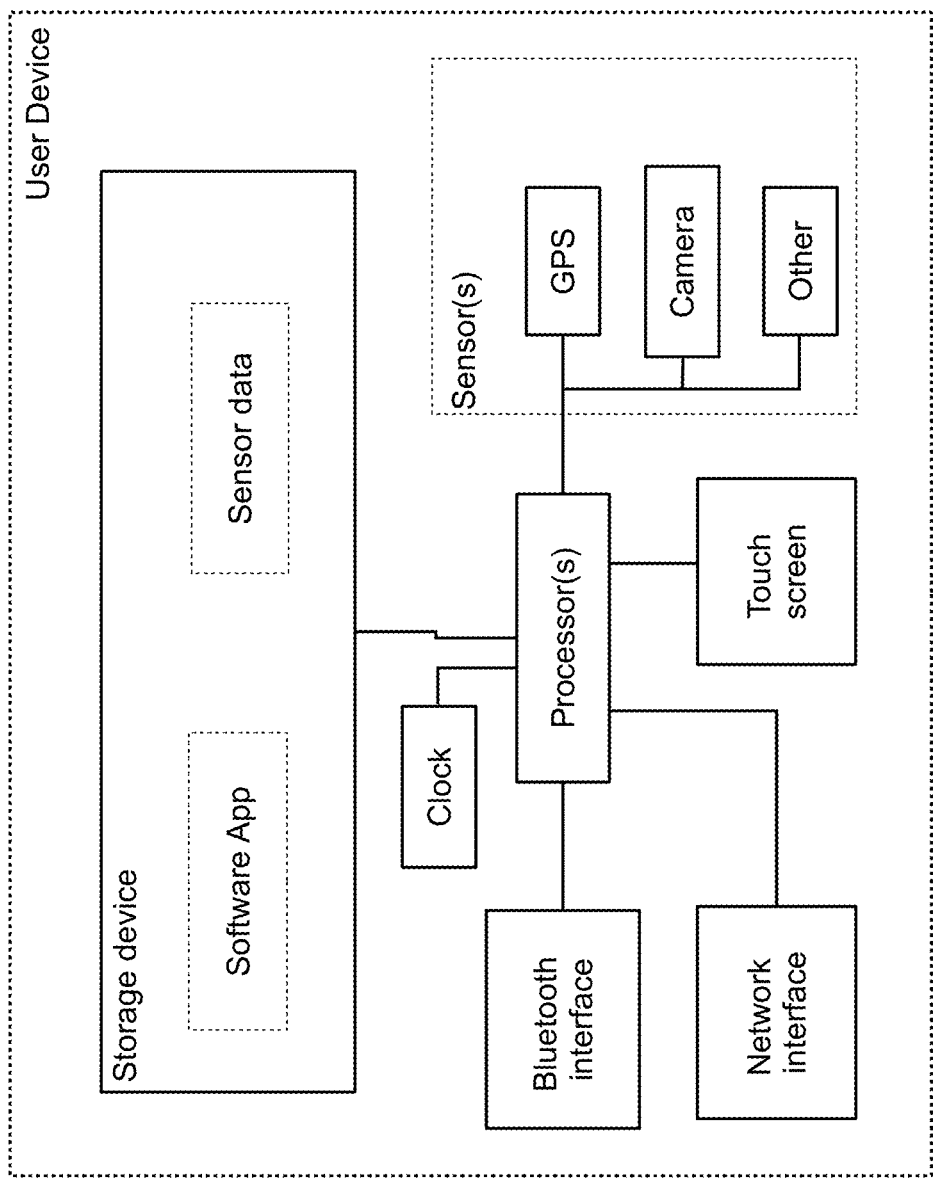
FIG. 2 shows a block diagram of each user device of FIG. 1 according to an exemplary embodiment.

FIG. 2 shows a block diagram of a user device of FIG. 1 according to an exemplary embodiment. In this embodiment, the user device is a portable electronic device such as a mobile phone. The user device includes a storage device which may also be implemented by a flash memory device and stores a software application. The software application works in conjunction with sensor data also stored in the storage device. The sensor data may include sensor data received from a GPS system, camera, and/or may include other data collected from one or more sensors included within the user device itself. The sensor(s) are coupled to one or more processors, which execute the software application loaded from the storage device. The one or more processors in this example are further coupled to a Bluetooth (BT) interface, to a touch screen acting as a user interface (UI), and to a network interface such as a WiFi adaptor to gain access to the Internet.

Figure 3:
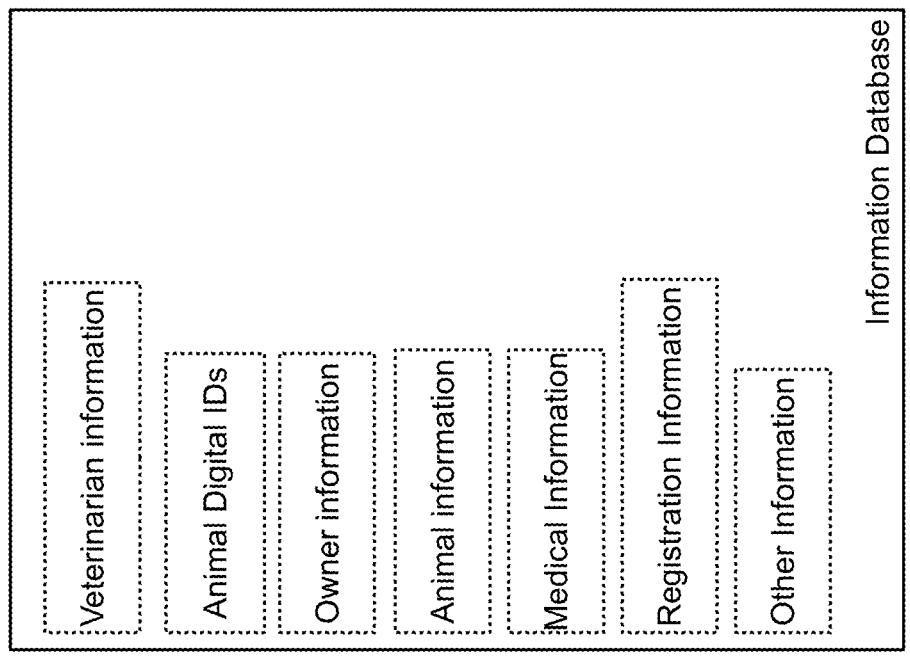
FIG. 3 shows various type of information stored in the storage device of FIG. 1 according to an exemplary embodiment.

FIG. 3 shows various types of information stored in the storage device according to an exemplary embodiment. The information database includes veterinarian information, the specific animal IDs, owner information, animal information, medical record information, and registration information. The veterinarian information includes the pet's history for visits to the veterinarian. The specific animal IDs are used to provide a specific digital ID to each registered animal. The owner information includes information such as the owner's name, the owner's address, the owner's contact information, and the owner's preferred way of being contacted, for example. The animal information which includes the animal's name, age, weight, fur colour, eye colour, nose colour, distinct marking information, food preferences, and play condition preferences, for example. The medical information includes the animal's vaccination records, general health conditions, allergy information, and other medical notes, for example. The registration information includes pet registration information with the government agency and any other agencies.

Figure 4:
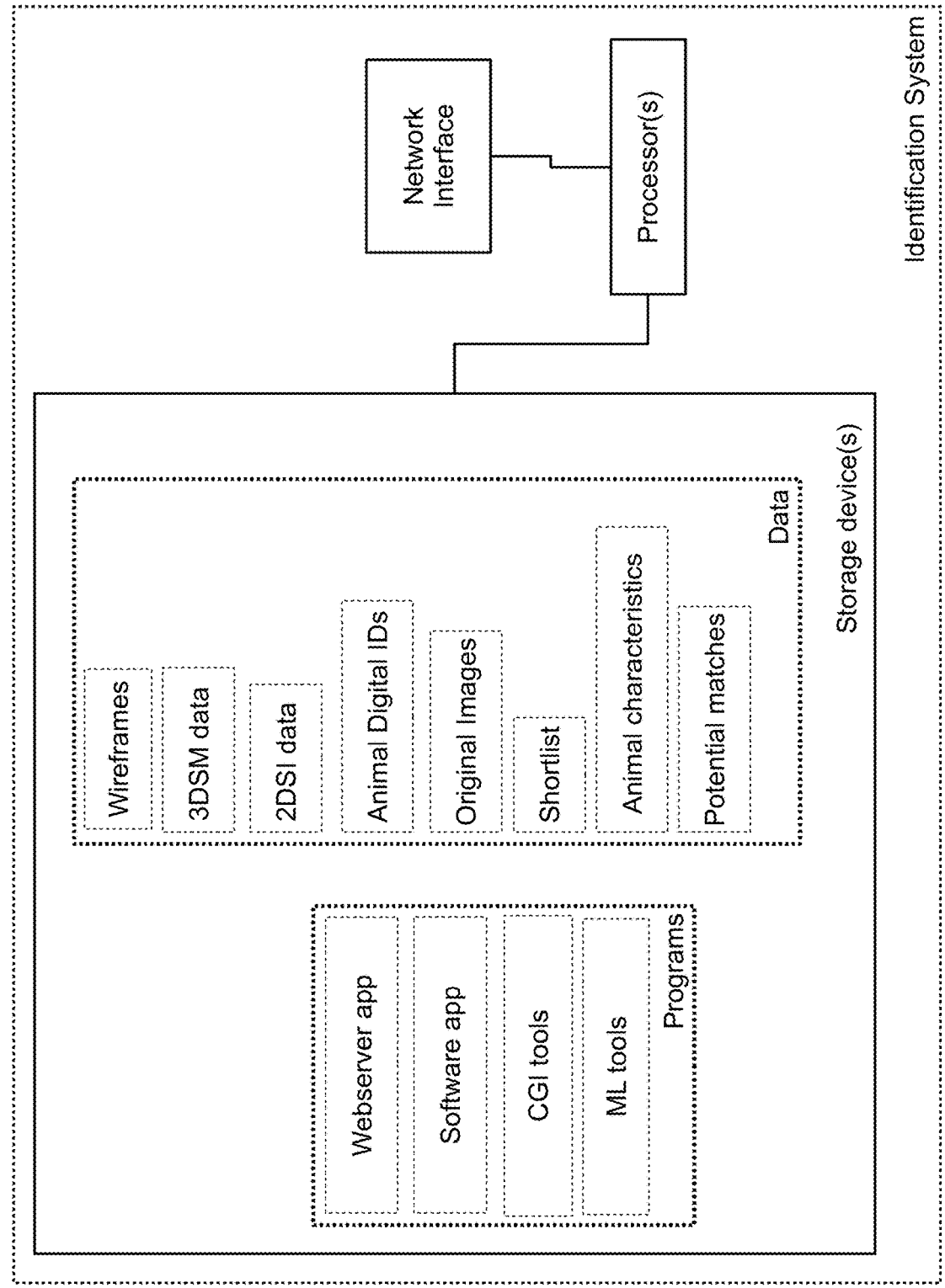
FIG. 4 shows a block diagram of the identification system of FIG. 1 according to an exemplary embodiment.

FIG. 4 shows a block diagram of the identification system according to an exemplary embodiment. The identification system includes the storage device, one or more processors, and a network interface. The storage device is coupled to the one or more processors and the processors are coupled to the network interface. The storage devices includes a webserver app, a software app, computer-generate imagery (CGI) tools, machine learning (ML) tools, stock wireframes, 3DSM data, 2DSI data, animal digital IDs, incoming image(s) of animal(s), a shortlist, animal characteristics, and a potential matches list. In this embodiment, the identification system is implemented on a single computer server; however, it is to be understood that the illustrated components may also be implemented by a plurality of computer servers in some embodiments.

The one or more processors may be included in a central processor unit (CPU) of a computer server acting as the identification system. In the following description the plural form of the word "processors" will be utilized as it is common for a CPU of a computer server to have multiple processors (sometimes also referred to as cores); however, it is to be understood that a single processor may also be configured to perform the described functionality in other implementations.

Figure 5:
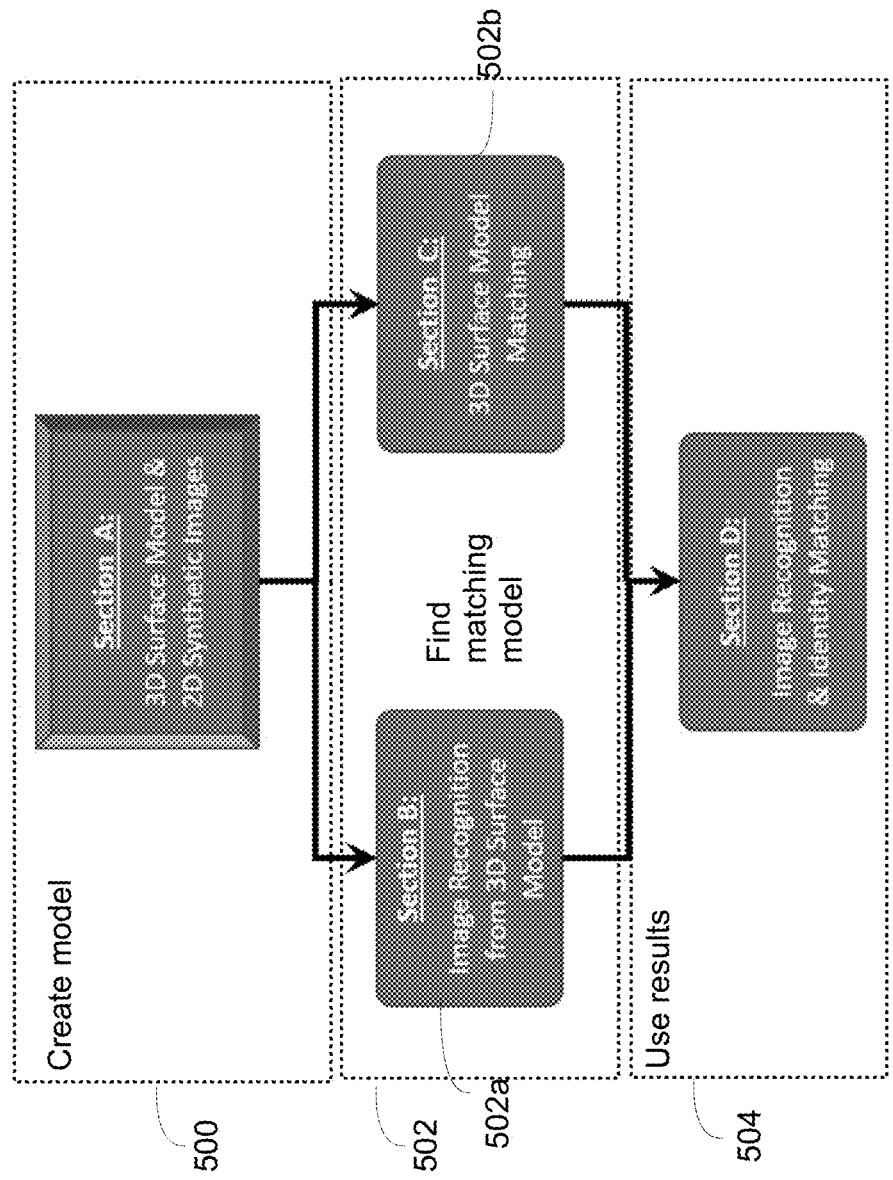
FIG. 5 shows a flowchart of a method of performing 3D biometric identification by the system of FIG. 1 according to an exemplary embodiment.

FIG. 5 shows a flowchart of a method of performing 3D biometric identification by the system of FIG. 1 according to an exemplary embodiment. The steps of FIG. 5 may be performed by the one or more processors of the identification system in some embodiments. The steps of the flowchart are not restricted to the exact order shown, and, in other configurations, shown steps may be omitted or other intermediate steps added.

At step 500, a user takes images or video of a target animal (TA) with a registered user device and the images are sent to the identification system to register a known animal.

The 3DSM generator uses the digital images of the target animal to generate a 3DSM of the known animal. A specific example of an actual process of generating the base 3DSM model of the animal performed at step 500 is described in further detail below with reference to FIG. 6. However, in addition to digital images, the user may also use various tools such as laser scanners, cameras with IR dot pattern generator that facilitate depth/position mapping, time of flight cameras, etc. for generating and/or optimizing the 3DSM. The 3DSM includes any surface features of the target animal which are visible or derivable from digital photos which are provided for generation of the 3DSM. Surface features include textures, coloration, and any other distinctive features such as relative size of any portions of the target animal. The user may place dimension calibrators such as coins or ruler beside the object to indicate actual dimensions of the object. Beyond surface features, 3DSM identification may also utilize information that can be derived from a 3DSM, such as volume, mass or other details. There are variety of methods that may be used to generate the 3DSM including photogrammetry, visual object network (VON), manual construction utilizing software such as Adobe® Photoshop® or Autodesk Maya®, custom developed machine learning/deep learning neural network tools, or combination thereof, for example.

As part of the process of generating the 3DSM of the animal, the 2DSI generator produces 2DSIs (two-dimensional synthetic images) of the 3DSM. Each 2DSI is a two-dimensional (2D) image derived from a 3DSM that is like a digital photo of an object represented by the model. A 2DSI can be created from any angle of view with the 3DSM posed in any possible position (e.g. sitting, standing, etc.), or with adjustments to other variable features (e.g. facial expression, hair/fur condition, skin pigmentation, etc.). In particular, the 3DSM may have parameters allowing the model to be dynamically adjusted to simulate moveable joints of an animal such knee joints, jaw joints, neck joints etc. In addition to joints, any moveable part of the animal can be incorporated into the model such as moveable ear positions, fur positions, eye positions, lip position, tongue position, etc. By configuring parameters of each movable part of the model, the model can be shaped to be in any desired position. For instance, a 3DSM of a dog may be configured to have the dog sitting, standing, jumping, lying on back or belly, etc. The model can also be adjusted for various conditions such as a wet animal, a dirty animal, a sick animal, a collared animal, a clothed animal, a clipped ear animal, an aged animal, or a combination thereof, for example.

The 3DSM and 2DSIs may also include fine details of any region of the object which might represent portions of the object's anatomy (i.e. eyes, nose, fur or skin coloration and/or morphology, tattoos, etc.) which may be especially beneficial for object identification. Furthermore, a 3DSM may incorporate potential variability in surface texture (i.e.

fur lying flat or raised) and coloration (i.e. range of coloration and pattern changes of a chameleon).

Creating the model at step 500 may also rely on digital photos or videos of the entire animal or any sub portion thereof such as images of the object's specific features (i.e. iris' of horses or humans, back and fin markings on whales, etc.) In this way, the biometrically accurate 3DSM generation technique disclosed herein may encompass any possible identifiable aspects of the animal. This enables the use of any digital photos, 2DSIs, and/or 3DSMs of the animal for the animal identification. Combining high-speed computing capability, CGI manipulation techniques, and ML techniques, the 2DSIs produced from 3DSM are a very close representation of actual digital photos of the object.

At step 502, the identification system receives images or video of an unidentified animal (UA) or a 3DSM of the UA. In general, step 502 involves matching the images or model of the unidentified animal with the model of a known animal. In other words, step 502 involves finding a matching model in order to identify the unidentified animal.

At step 502a, the UA images are compared to the 2DSIs of a known animal as generated from the 3DSM of the known animal. The 2DSIs of the known animal's model may be generated to have the same orientation, leg and tail positions, facial expressions and fur conditions as the incoming UA images. The ability to change the conditions, the orientation, the position, and the moveable parts of the 3DSM is particularly advantageous as it greatly improves the ability to match the UA images to the synthetic images utilizing image comparison tools. As an alternative or addition, at step 502b, the 3DSM of the TA is compared to a 3DSM of the UA. This step is advantageous when the user has an ability to generate the 3DSM using their user devices. By comparing the 3DSMs directly, the processors are not required to generate the 2DSIs.

At step 504, when the unidentified animal (UA) identity has been matched to a specific target animal (TA), i.e., a known animal, the user from which the UA images was received may request information from and/or other otherwise contact the owner of the target animal.

Figure 6:
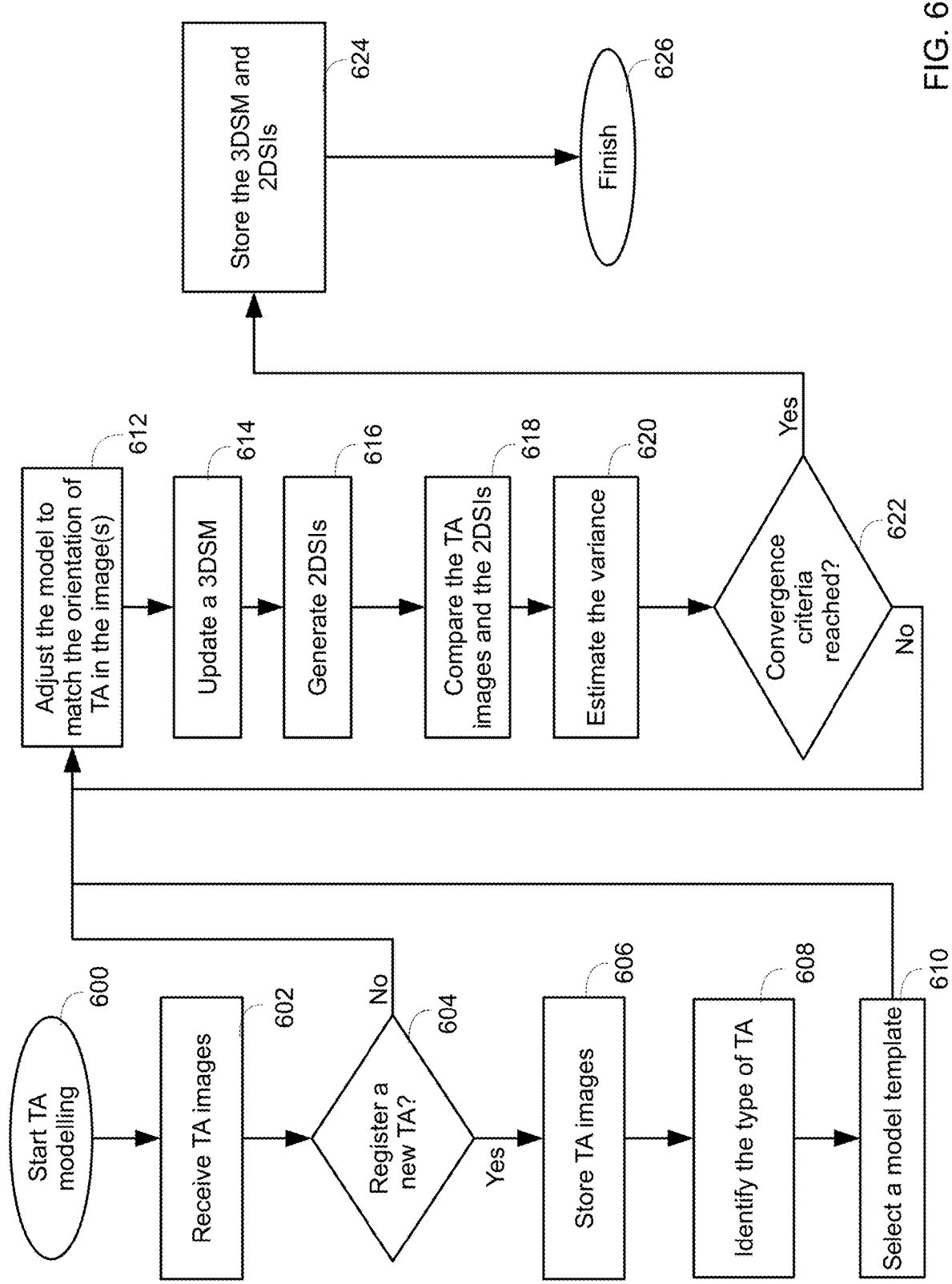
FIG. 6 shows a flowchart of a method of generating a three-dimensional surface model (3DSM) and the two-dimensional synthetic images (2DSIs) according to an exemplary embodiment.

FIG. 6 shows a flowchart of a method of generating the 3DSM and the 2DSIs according to an exemplary embodiment. In some embodiments, the flowchart of FIG. 6 corresponds to step 500 of FIG. 5 to generate a baseline model of a known animal. The steps of FIG. 6 may be performed by the processors of the identification system. The steps of the flowchart are not restricted to the exact order shown, and, in other configurations, shown steps may be omitted or other intermediate steps added.

Example benefits of this embodiment are explained with a use case scenario of boarding an animal at a boarding home. Animal boarding homes may require boarded animals to have certain vaccinations, verified health conditions, and/or government registrations prior to being admitted. Currently, a boarding home could rely on animal owner/guardian attestation that any such credentials are associated with a particular animal, and/or providing physical or digital copies of relevant documents. However, to verify said credentials, the boarding home might be required to have special equipment such as a RFID chip reader to determine if the animal is the one linked with such credentials. This places potential risk on the boarding home (i.e. if an animal is admitted based on an attestation, which is false, and then other animals become sick due to a transmitted disease), or it could increase time and financial burdens on the pet owner/guardian and the boarding home have to use RFID or other ID technologies.

Using the biometric identification system of FIG. 1 with a 3DSM of the animal linked to an animal digital identity enable the owner/guardian and the boarding home to rely simply on images of the animal to verify the animal's identify. The images could be taken with a smartphone carried by either the animal owner or provided by the boarding home. This is a lower burden process, with respect to both time and financial costs, for animal owners/guardians and boarding homes.

At step 600, the user starts the app to register a new animal or update the 3DSM model for an existing (already registered) animal.

At step 602, the identification system receives images of the target animal (TA). The user may take images from various angles including a top view, a back view, side views, a head shot, etc. The user may also be interested in capturing any distinct markings on the animal. In some embodiments, the user may upload a video of the TA and the series of images forming the video may constitute the incoming images of the TA.

At step 604, the identification system determines whether the images correspond to a TA already registered in the system or whether the user wants to register a new TA. Providing new images corresponding to an already-registered TA is particularly advantageous as the animal ages and is likely to change physical characteristics such as height and physical structure. When it is determined the user wants to update an existing model with new images, the control proceeds to step 612; otherwise, for registering a new animal, control proceeds to step 606.

At step 606, the images of the TA are stored in the storage device. The user may also share other animal information including name, age, weight, gender, breed, vaccine information, medical information, and registration information which is also stored in the information database. The software app on the mobile phone may automatically retrieve information such as vaccine information and medical information from a government database. The animal is also assigned a specific animal ID which is used to uniquely identify the target animal from other registered animals in the information database.

At step 608, the processors of the identification system distinguish the target animal from the background in the TA image(s) by performing background and foreground segmentation. For example, if the owner takes a picture of the dog playing in snow, the machine learning tools extract the target object information from the background information. In other words, the background and foreground segmentation separate the dog from the snow.

At step 610, the processors select a model template based on the target animal information. For instance, the processors may identify a type of the target object being a "dog" and then select a basic dog model template as the starting model from the database. In general, the processors utilize some information of the target animal in order to select an initial wireframe model from the model generation process will begin. The user may also assist the processor by selecting an initial wireframe model corresponding to the type of the target animal or selecting a classification of the target object. For example, if the user is registering a poodle dog, the owner may select a poodle dog wireframe or a generic dog wireframe. The user may use dimension calibrators such as coins or rulers beside the target animal to indicate actual dimensions of the target animal. The model template may be automatically or manually selected based on the information provided at steps 602-606.

At step 612, the processors determine the orientation and position of the target animal in a TA image received at step 602 and adjust the model template to match the orientation and position. For example, in the model template the dog may be sitting while in the TA image the dog is standing up. In this case, the moveable joints on the model template are reconfigured based on the image such that the model of the dog is now standing up.

At step 614, the 3DSM generator uses the images of the target animal received at step 602 and/or variance information provided at step 622 to update the 3DSM. Specifically, the 3DSM of the target animal is updated based on the incoming images of the target animal received at step 602 and/or variance information provided at step 622. The fur texture of the model may be different from the fur texture of the target animal in the images and the model may therefore be updated at this step to more closely match the actual fur texture. Likewise, if particular change is made but variance information from a last iteration at step 622 is greater than it was prior to the change, the particular change may be undone or modified at step 614.

At step 616, the 2DSI generator uses the 3DSM to generate one or more two-dimensional synthetic images (2DSIs). The 2DSIs can be generated from any angle and are refined using machine learning and CGI tools to match as closely as possible the same angle from which the incoming TA image is taken of the target animal. In other words, at step 616, a synthetic image of the model is taken such that the resulting synthetic image of the model has the target animal of the model with a size, position, orientation, location, etc. closely matching the target animal in the incoming TA image received at step 602.

At step 618, the evaluation server compares the one or more 2DSI(s) generated at step 616 to the original images of the target animal received at step 602. Machine variance functions are used to determine the differences between the original images and the 2DSIs.

At step 620, the evaluation server estimates a variance between the TA images and the 2DSIs of the TA. The variance may be used to adjust the 3DSM in further iterations. For purposes of explanation, the lower the variance value calculated at step 620, the better the synthetic images from step 616 match the incoming TA images from step 602.

At step 622, the evaluation server determines whether a stop criterion such as a minimum variance level or maximum number of iterations has been reached. When one or more of the stop criteria have been reached, the control proceeds to step 624; otherwise, the control proceeds to step 612.

At step 624, assuming the convergence criteria of step 622 was reached because the variance is lower than a predetermined threshold, i.e., there is a good match, the 3DSM and the 2DSI are stored in the storage device for the target animal and the registration process for the TA is successfully completed.

Although not illustrated, it is also possible that convergence will never be reached and the variance will be too high. In this case, the stop criteria may be a threshold number of attempts and an error message be generated and sent to the user rather than storing the 3DSM at step 624.

Figure 7:
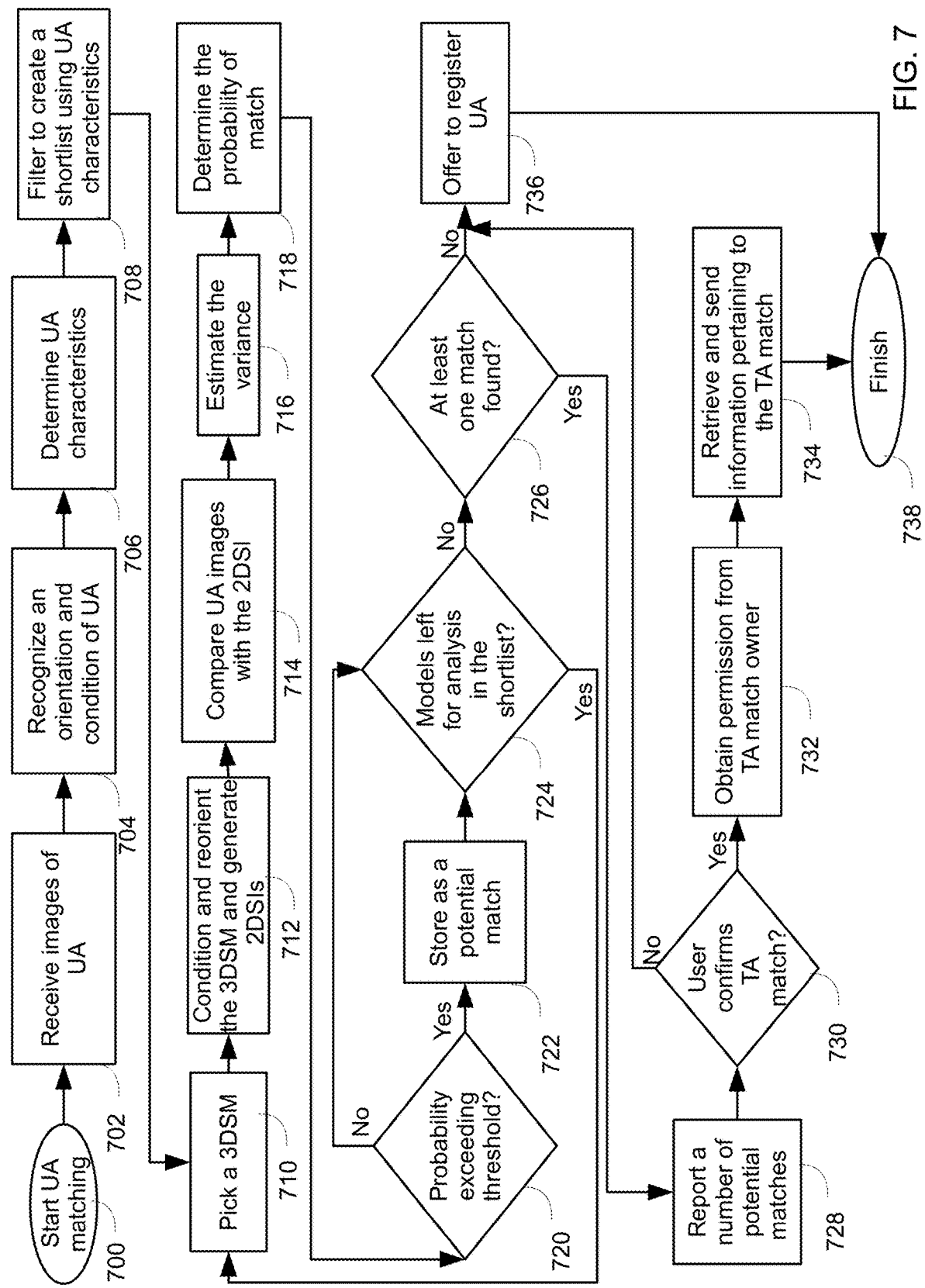
FIG. 7 shows a flowchart of a method of identifying an unknown animal according to an exemplary embodiment.

FIG. 7 shows a flowchart of a method of identifying an unknown animal according to an exemplary embodiment. In some embodiments, the flowchart of FIG. 7 corresponds to step 502a of FIG. 5 to find a matching model of an unidentified animal based utilizing dynamically generated synthetic images. The steps of FIG. 7 may be performed by the processors of the identification system, for example. The steps of the flowchart are not restricted to the exact order shown, and, in other configurations, shown steps may be omitted or other intermediate steps added.

At step 700, a user starts a software application on their user device to attempt to match an unidentified animal (UA) with a target animal. Continuing the above example of the boarding facility, the user in the following description is assumed to be an employee at the boarding home that wishes to obtain medical records and registration information of an unidentified dog.

Figure 8:
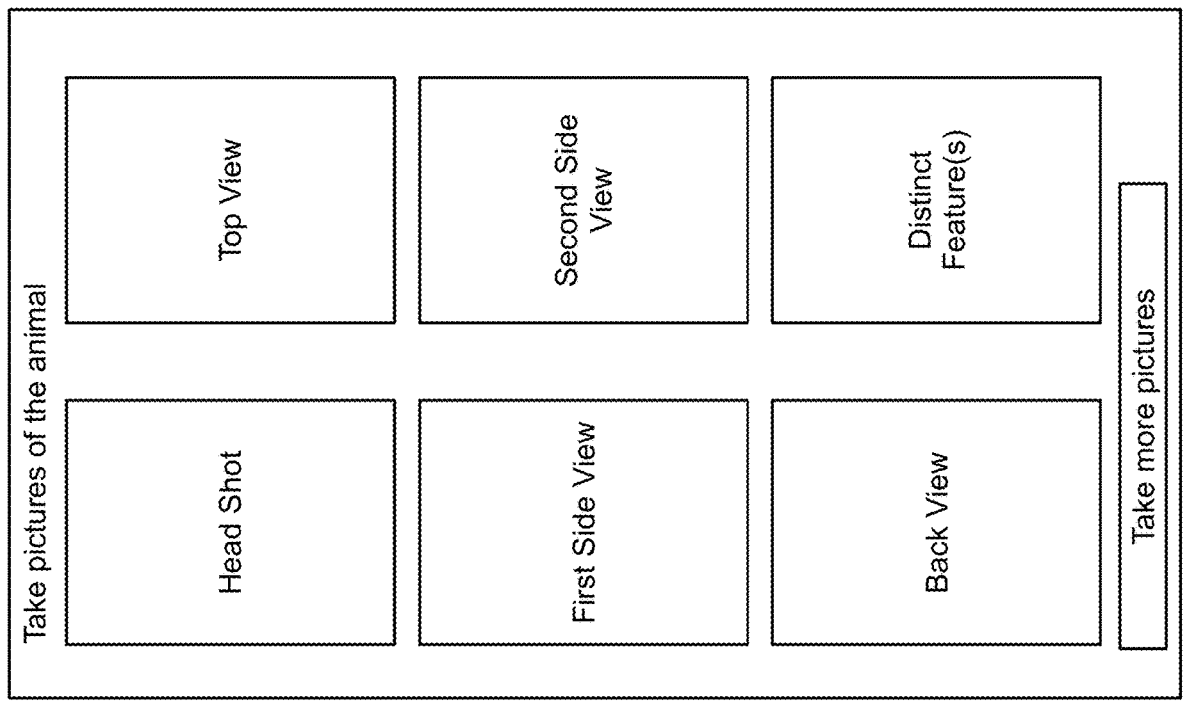
FIG. 8 shows a first user-interface screen for a requester for capturing images of an unknown animal according to an exemplary embodiment.

At step 702, the user takes images of the UA brought in by the owner to get additional information pertaining to the pet. FIG. 8 shows a first user-interface screen for the requester for capturing the images of the UA according to an exemplary embodiment. The user that is requesting information about the animal is prompted to take a head shot, a top view, a first side view, a second side view, a back view, and images of distinct features such as a birthmark. The user may choose to take additional pictures of the animal as well. In some embodiments, the user is required to only take one image of the UA, but additional images are likely to improve the 3DSM matching process and are encouraged by the software app.

At step 704, the processors identify the UA as well as the orientation, the condition, and the position of the UA in the incoming image(s). For example, this step may involve the processors determining a type of the UA in the incoming image(s). Likewise, the view angle of the unidentified animal and size and locations of the unidentified animal are all identified and stored.

At step 706, the processors determine UA characteristics based on the images of the UA and/or information provided by the user. For example, the UA characteristics may include information such as the UA is a poodle dog with white fur, black eyes, and a brown nose. The employee may supply additional information such as age of the animal to facilitate quicker identification. The employee may get the age information from the owner who is likely to be at the boarding home when dropping off the animal.

At step 708, the shortlist server is used to create a shortlist of possible models that may match using the image characteristics. The shortlist server communicates with the storage device which has the information regarding the animal characteristics of the models of the various registered animals. This step is particularly advantageous as it can drastically speed up the identification process based on set parameters. For example, the storage device may have models of one-thousand animals stored, but only a small fraction is likely to have the UA characteristics that would ever match. Creating a shortlist based on UA characteristics often makes the identification process faster.

At step 710, the processor selects a 3DSM for matching to the unidentified images. In preferred embodiments, a selected 3DSM is picked from the shortlist created using the UA characteristics at step 708. In other words, if the shortlist includes a possible forty poodle dogs with white fur, black eyes, and a brown nose, the selected 3DSM will be for one of the forty short-listed dogs.

At step 712, the 3DMS generator adjusts the selected 3DSM and the 2DSI generator generates the 2DSIs. The selected 3DSM is adjusted based on the orientation, the position, and the condition of the unidentified animal (UA) in the incoming UA image(s) received at step 702. This step is similar to step 612 where various adjustments are made to the model based on the incoming TA images. For example, the dog may be jumping in the incoming UA image, while the selected 3DSM may be stored in the database configured with the model of the dog in a standing position. The moveable joints of the 3DSM are therefore manipulated (configured) by the processors at step 712 to change the orientation and the position of the 3DSM to match the orientation and position of the UA in the incoming image. The likelihood of correctly matching the unidentified animal is improved by the ability of the processors to automatically change the conditions and the orientation and position of the moveable joints of the 3DSM. Once the model is configured to match the unidentified animal in the incoming image, the 2DSI generator then produces a 2DSI of the selected 3DSM. Similar to as described in step 616, the viewing angle and distance from the model that the synthetic image (2DSI) is generated is configured by the processors to match as closely as possible these same parameters in the incoming UA image.

At step 714, the UA image(s) are compared to the 2DSI(s) generated for the selected 3DSM.

At step 716, the evaluation server estimates the variance between the selected 2DSIs and the images of the UA. High variance means larger differences between the images of the UA and the selected 2DSI. Steps 714 and 716 may be performed by the processors very similar to how steps 618 and 620 of FIG. 6 are performed, for example.

At step 718, the evaluation server estimates a probability of match between the images using the variance. In some embodiments, the estimated variance can be converted into a percentage and the estimated variance is subtracted from 100% to determine a probability of match. For example, an estimated variance of 5% means the probability of match is 95%.

At step 720, the processors determine whether the probability of match exceeds a threshold probability. When the probability of match exceeds the threshold probability, this means the match is good and control proceeds to step 722; otherwise the match is not of sufficient level and control proceeds to step 724.

At step 722, the specific digital identity corresponding to the selected 3DSM is stored in the storage device as a potential match.

At step 724, the control determines whether there are additional 3DSMs left for analysis based on the shortlist that was created at step 708. When yes, the control proceeds to step 710 to pick one of the remaining 3DSMs left for analysis as a new 3DSM to test; otherwise control proceeds to step 726.

At step 726, the control determines whether at least one of the selected model(s) exceeds the probability threshold and was stored as a potential match at step 722. When yes, the control proceeds to step 728; otherwise the control proceeds to step 736.

Figure 9:
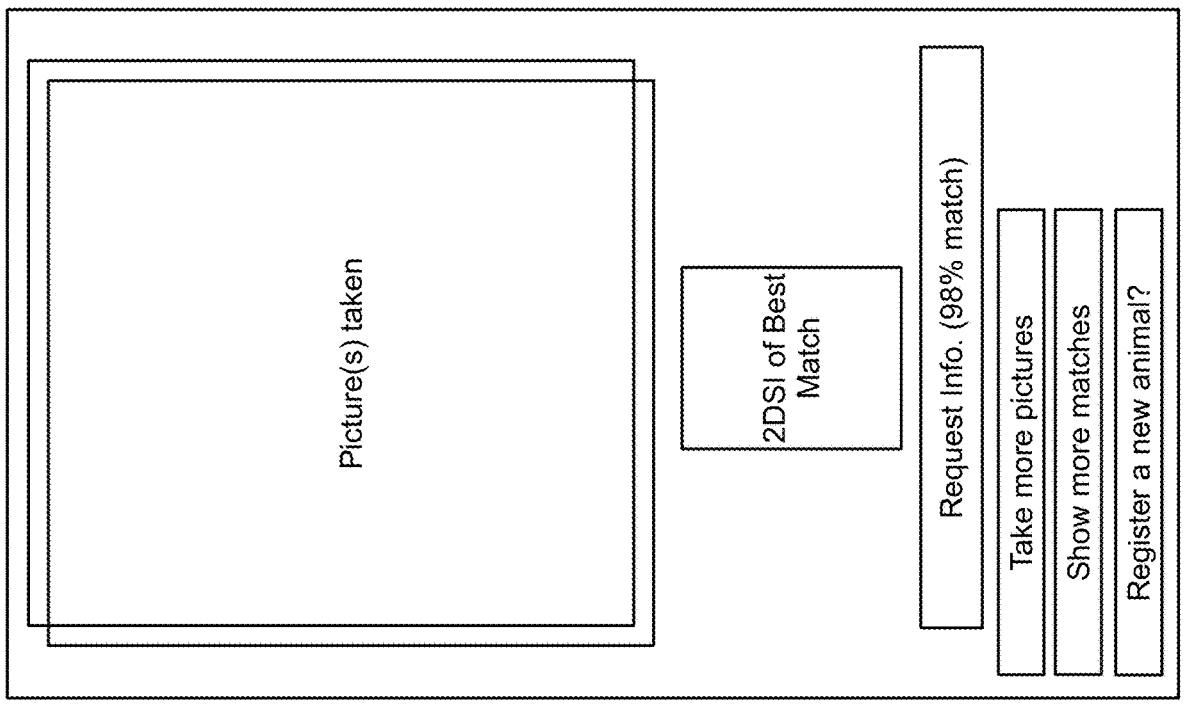
FIG. 9 shows a second user-interface screen for a requester displaying a best match of an unknown animal according to an exemplary embodiment.

At step 728, the processor reports a number of potential matches to the user along with their probability of match. FIG. 9 shows a second user-interface screen for the requester according to an exemplary embodiment. The user is shown a picture of the unidentified animal. The UI screen also displays the 2DSI of the best match. In this embodiment, the best match is the match with the highest probability of match. The user may request information for the best match or any other match; the user has the option to view other matches and their probability of match by clicking on "Show more matches". The user may also take more pictures at this stage or select to register a new dog if no match is found.

At step 730, the processors determine whether the user confirms a match. When yes, the control proceeds to step 732; otherwise the control proceeds to step 736.

Figure 10:
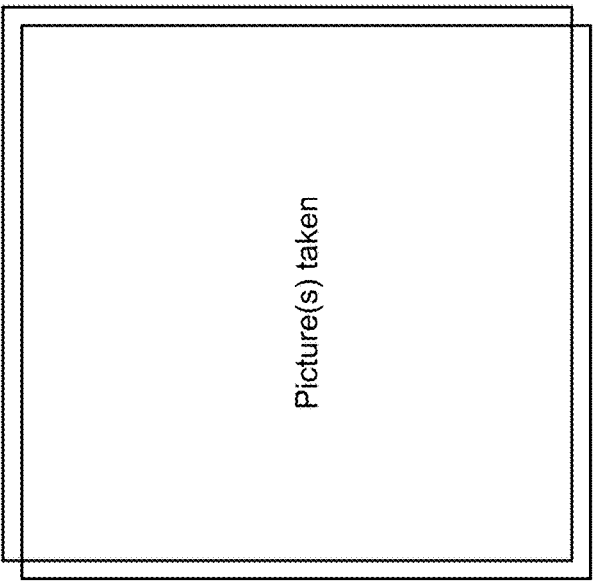
FIG. 10 show a user-interface screen displayed to an owner of a matched animal asking for permission for personal information according to an exemplary embodiment.

At step 732, the processors send a permission request to the owner of the matched 3DSM to obtain the medical records for registered TA associated with the 3DSM. FIG. 10 show a user-interface screen displayed to the owner according to an exemplary embodiment. When the boarding home employee confirms the match and selects the "Request info" button in FIG. 9, the processors send a request to obtain the medical records for the specific digital identifier associated with the matched 3DSM. As shown in FIG. 10, the owner can either provide access to the information by selecting "Yes" or decline the request for information by selecting "No".

Figure 11:
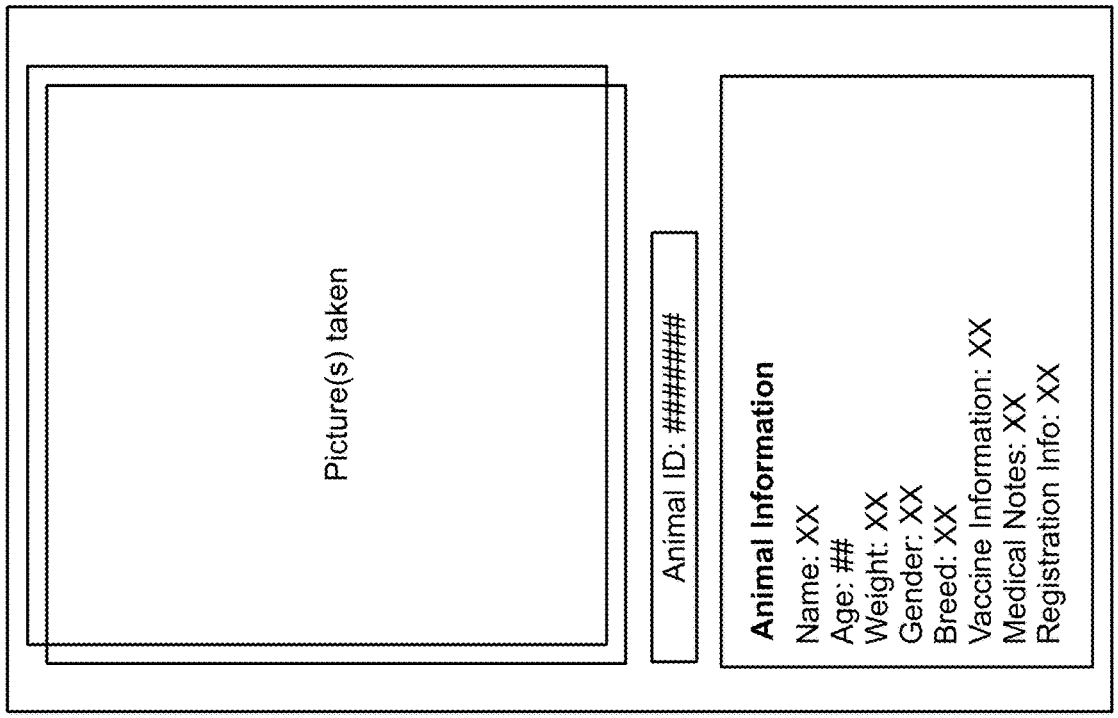
FIG. 11 shows a third user-interface screen for the requester receiving personal information of the target animal according to an exemplary embodiment.

At step 734, the processors retrieve the required information for the UA which has now been identified after the owner has granted access to the requester. The requested information is then sent to the requester's user device. FIG. 11 shows a third user-interface screen for the requester according to an exemplary embodiment. The boarding home employee now has access to the specific animal digital ID and animal information corresponding to the identified animal. In some embodiments, the owner may choose to restrict the information seen by the employee of the boarding home.

At step 736, when the control does not find a potential match to the UA, the control offers to register the UA. For example, this step may correspond to the "Register a new animal?" button in FIG. 9, and this button may only be presented in the event no match of a suitable probably of match is found. When the requesting user selects to register the UA, the baseline model generation process of FIG. 6 may be started at step 600, for example. In this case, the incoming TA images at step 602 may be the exact same UA images that were received at step 702.

Figure 12:
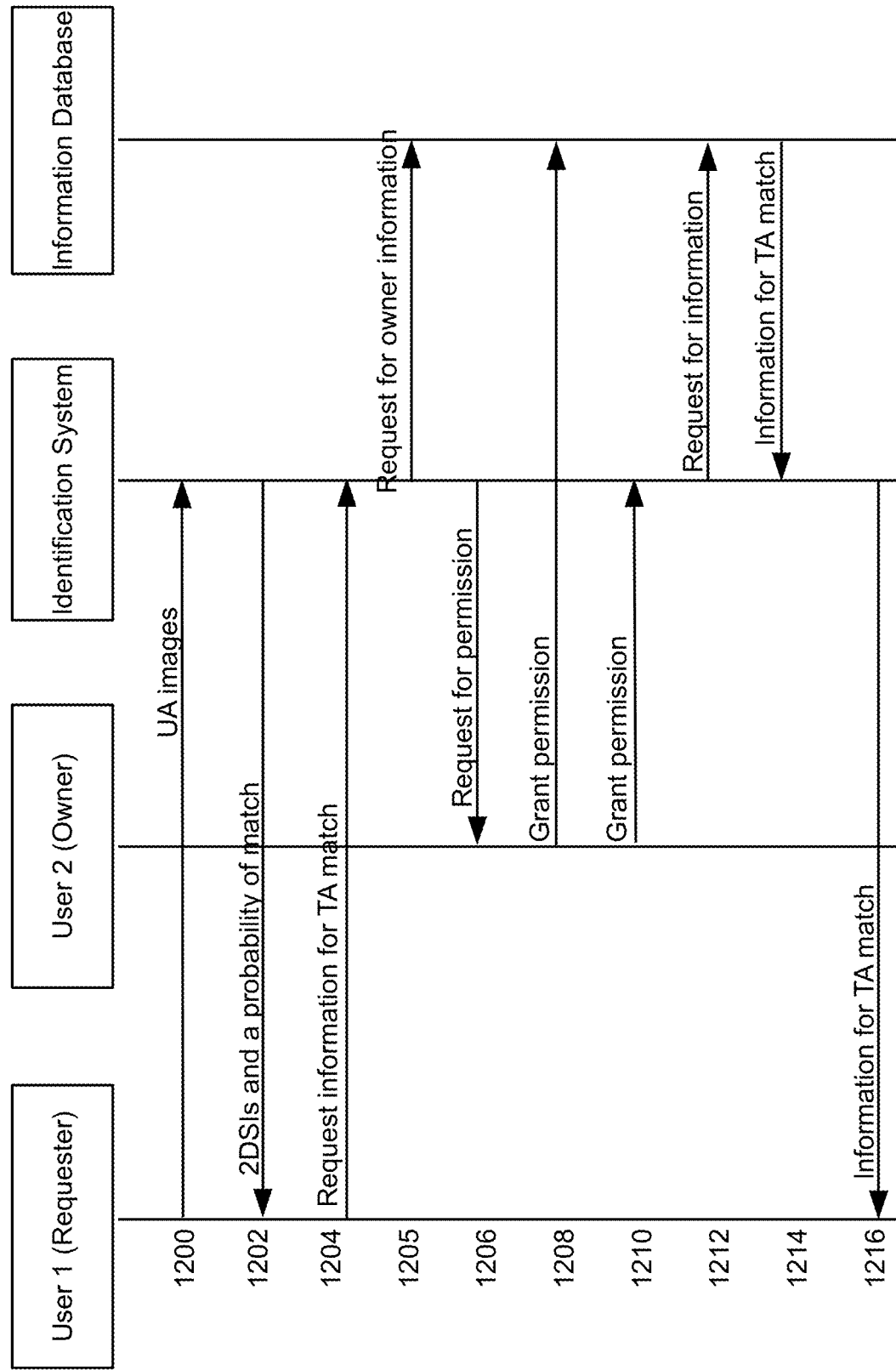
FIG. 12 shows a time line of interaction between different components of the system of FIG. 1 for obtaining permission to access the information database according to an exemplary embodiment.

FIG. 12 shows a flowchart of the method of obtaining permission to access the information database according to an exemplary embodiment. At step 1200, the requester user device sends images of the UA to the identification system. At step 1202, the identification system sends the 2DSIs and a corresponding probability of match to the requester. At step 1204, the requesting user device sends a message selecting a particular match for obtaining additional information. The software app sends an information request to the identification system for getting information for the TA match. At step 1205, the identification system requests to get the owner information from the information database using the animal's digital ID.

At step 1206, the identification system requests permission from the owner user device whether to allow the requester to access the requested information. In the above example of a boarding home facility, the employee sends a request for getting additional information about the dog from the owner. At step 1208, the owner grants access to the identification system. The correct dog owner is likely to allow the boarding home employee to have access to the information. If the employee has contacted an incorrect owner, they are likely to deny their request.

At step 1210, the owner grants permission to the information database where the information is stored. At step 1212, the identification system requests the data from the information database when the permission has been granted. At step 1214, the information database passes the information for the target animal to the identification system. At step 1216, the identification system passes the requested information to the requester. This allows the boarding home employee to have access to the animal information which includes its age, breed, weight, vaccine information, medical information, and registration information.

Figure 13:
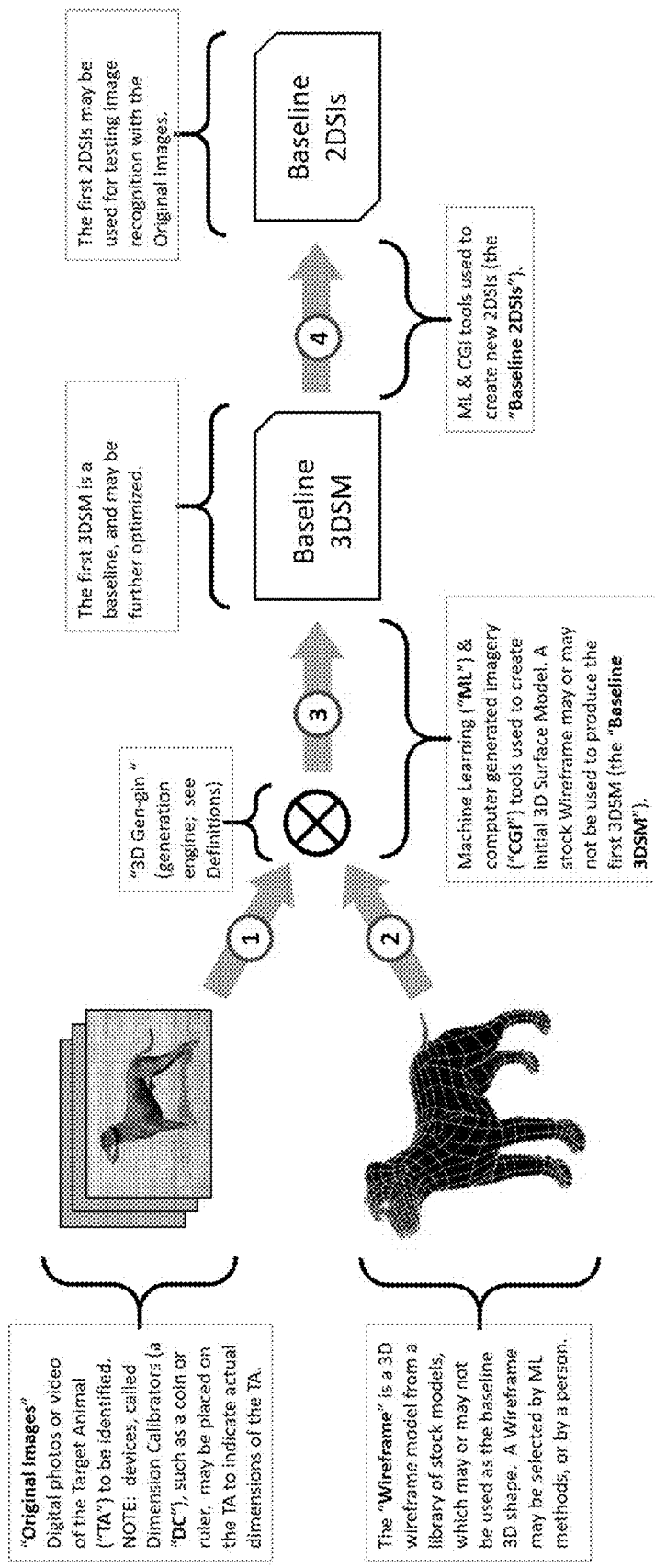
FIG. 13 shows an example of generation of a baseline model for a target animal being a dog according to an exemplary embodiment.

FIG. 13 shows an example of generation of a baseline 3DSM and a baseline 2DSI for a target animal being a dog according to an exemplary embodiment. This figure is a block diagram that illustrates how digital photos of an animal, potentially with the use of a generic 3D wireframe model of a similar animal, along with CGI and ML are used to generate an initial baseline 3DSM and baseline 2DSIs. The user takes images or video of the TA to be identified and selects a 3D wireframe from a library of stock models. As described above, the wireframe model may also be automatically selected by the one or more processors. Machine learning (ML) and CGI tools are used to produce the baseline 3DSM and create the baseline 2DSIs from the baseline 3DSM. The baseline 3DSM and the baseline 2DSIs may be further optimized as illustrated in FIG. 14.

Figure 14:
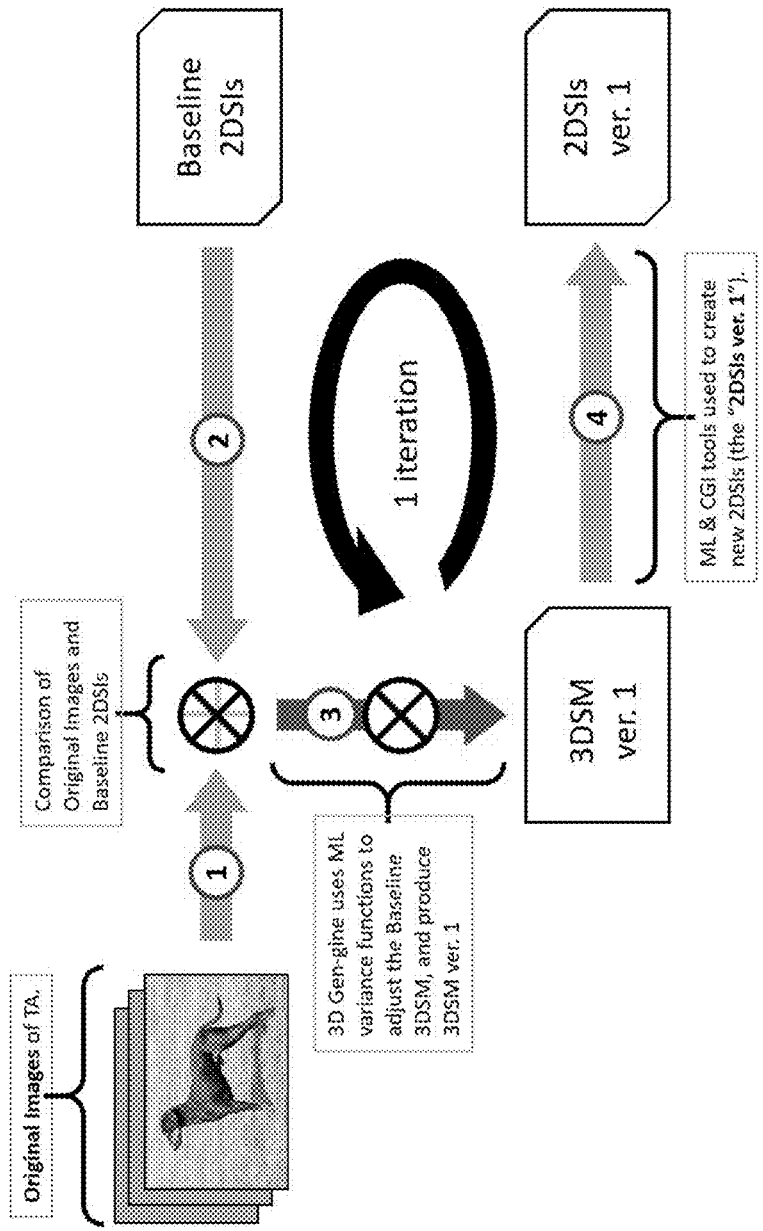
FIG. 14 shows the optimization of the baseline model of FIG. 13 by repeating the model adjustment process utilizing the original images of the dog according to an exemplary embodiment.

FIG. 14 shows the optimization of the baseline 3DSM with original images according to an exemplary embodiment. This figure is a block diagram that illustrates the first iteration of how a baseline 3DSM is optimized by comparing the original images and 2DSIs that are derived from the baseline 3DSM. Original images of the TA are compared to the baseline 2DSIs and the variance is used to adjust the baseline 3DSM. The baseline 3DSM is used to adjust the 2DSIs. In short, an iteration is performed to create a better model. Further iterations may also be performed to continue optimizing the model as shown in FIG. 15.

Figure 15:
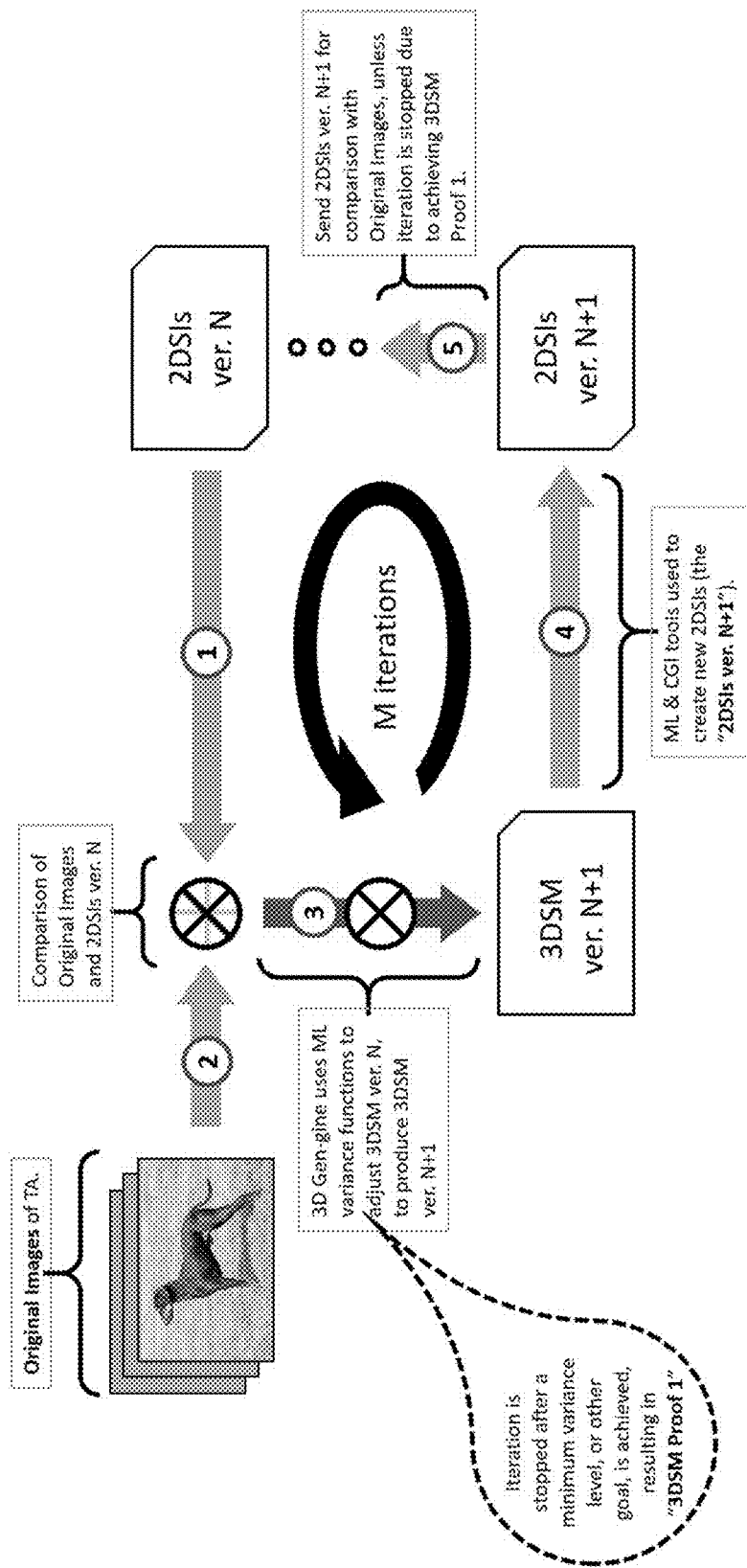
FIG. 15 shows yet further optimization of the baseline model by iterating the model adjustment process a plurality of times until a threshold level of match is reached utilizing original images according to an exemplary embodiment.

FIG. 15 shows further optimization of the baseline 3DSM with original images according to an exemplary embodiment. This figure is a block diagram that illustrates how the baseline 3DSM is further optimized with a series of iterations of comparisons between the original images and 2DSIs that are derived from incrementally improved 3DSMs, following the first comparison cycle illustrated in FIG. 14. The iteration cycle would continue until a certain minimum variance threshold is calculated between original images and a set of 2DSIs from an optimized 3DSM, or when any other metric is achieved (i.e. fixed number or iterations, etc.), at which point the final 3DSM is selected as 3DSM Proof 1.

The original images of the TA are compared to the 2DSIs generated in the previous step. ML tools such as the variance function are used to further update the 3DSM. The updated 3DSM is used to generate the 2DSIs. The procedure is repeated until a convergence criteria or maximum number of iterations has been achieved. Assuming successful convergence and a good quality match, the 3DSM and 2DSI are stored as a 3DSM of the target animal and 2DSI, respectively.

Figure 16:
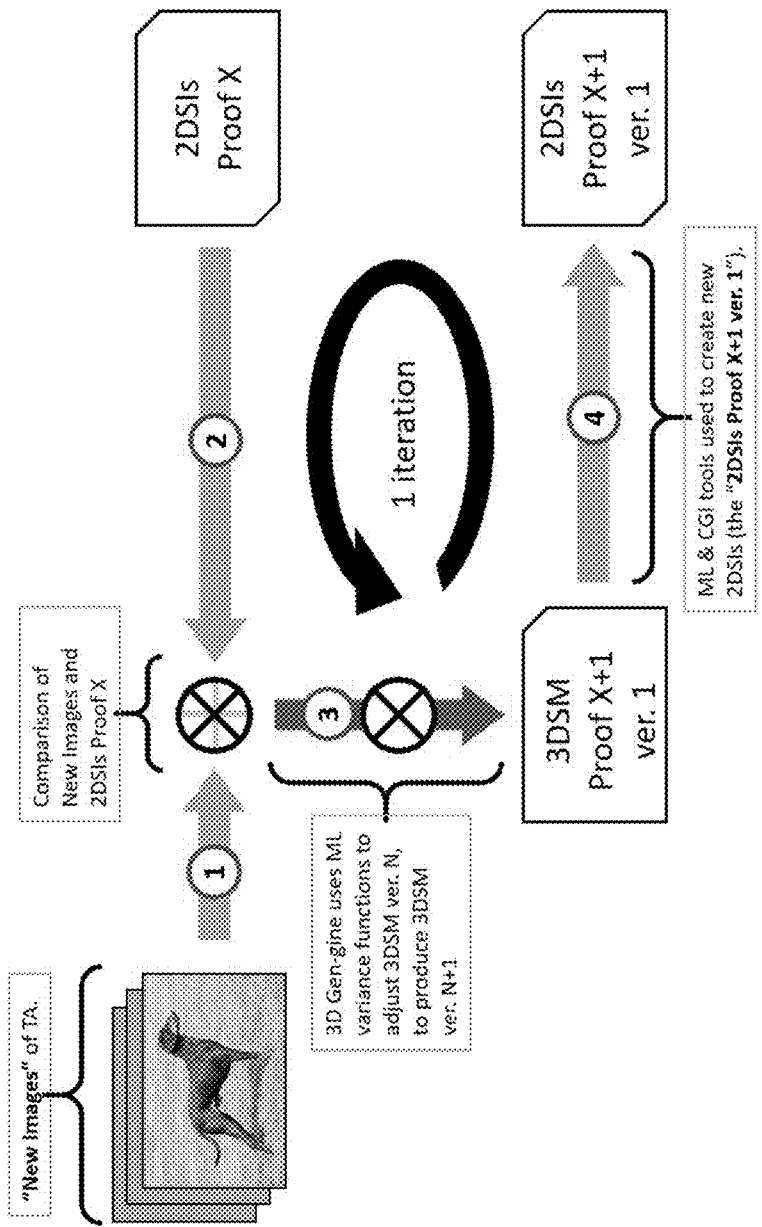
FIG. 16 shows optimization of the model generated in FIGS. 13-15 with new images of the dog according to an exemplary embodiment.

FIG. 16 shows optimization of the 3DSM proof with new images according to an exemplary embodiment. This figure is a block diagram that illustrates the first iteration of how a 3DSM proof X is optimized by comparing new images of the animal and 2DSI proofs that are derived from the 3DSM proof X. As mentioned above, the user may wish to update the 3DSM proof with new images for a variety of reasons such as the pet aging or different conditions. The new images of the TA are compared to the 2DSIs proof. Again, ML tools are used to update the 3DSM proof and the 2DSIs proof according to the variance information, for example.

Figure 17:
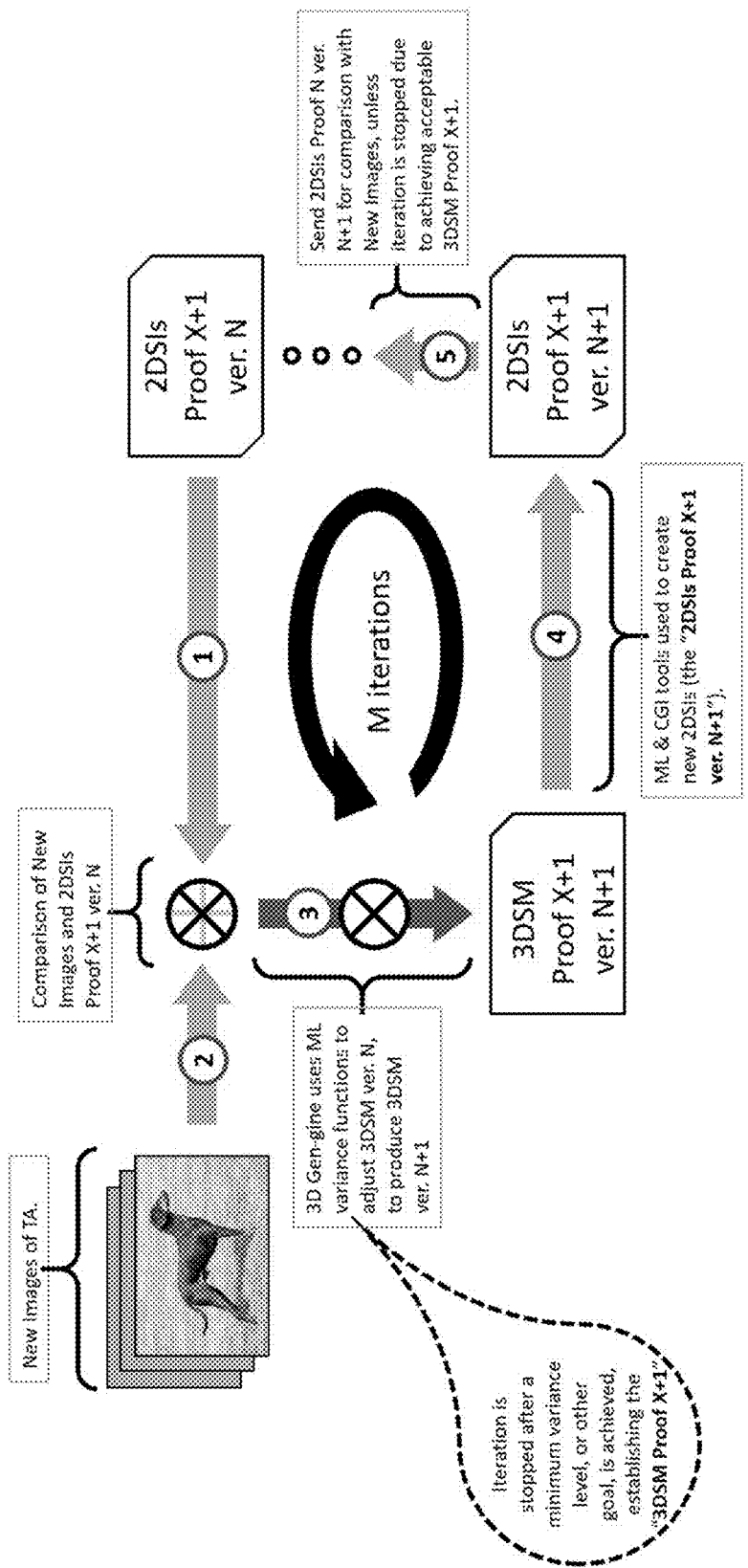
FIG. 17 shows further optimization of the model of FIG. 16 by iterating the model adjustment process until the threshold level of match is reached utilizing the new images according to an exemplary embodiment.

FIG. 17 shows further optimization of the 3DSM proof with new images according to an exemplary embodiment. This figure is a block diagram that illustrates how a 3DSM proof X is further optimized with a series of iterations of comparisons between the new images and 2DSI proof X images that are derived from an incrementally improved 3DSM proof X, following the first comparison cycle illustrated in FIG. 16. The iteration cycle would continue until a certain minimum variance threshold is calculated between new images and a set of 2DSIs from the optimized 3DSM proof, or when any other metric is achieved (i.e. fixed number or iterations, etc.), at which point the final 3DSM proof is selected as 3DSM proof X+1. The new images of the TA are compared to the updated 2DSI proofs until the convergence criteria or the maximum number of iterations is achieved.

Figure 18:
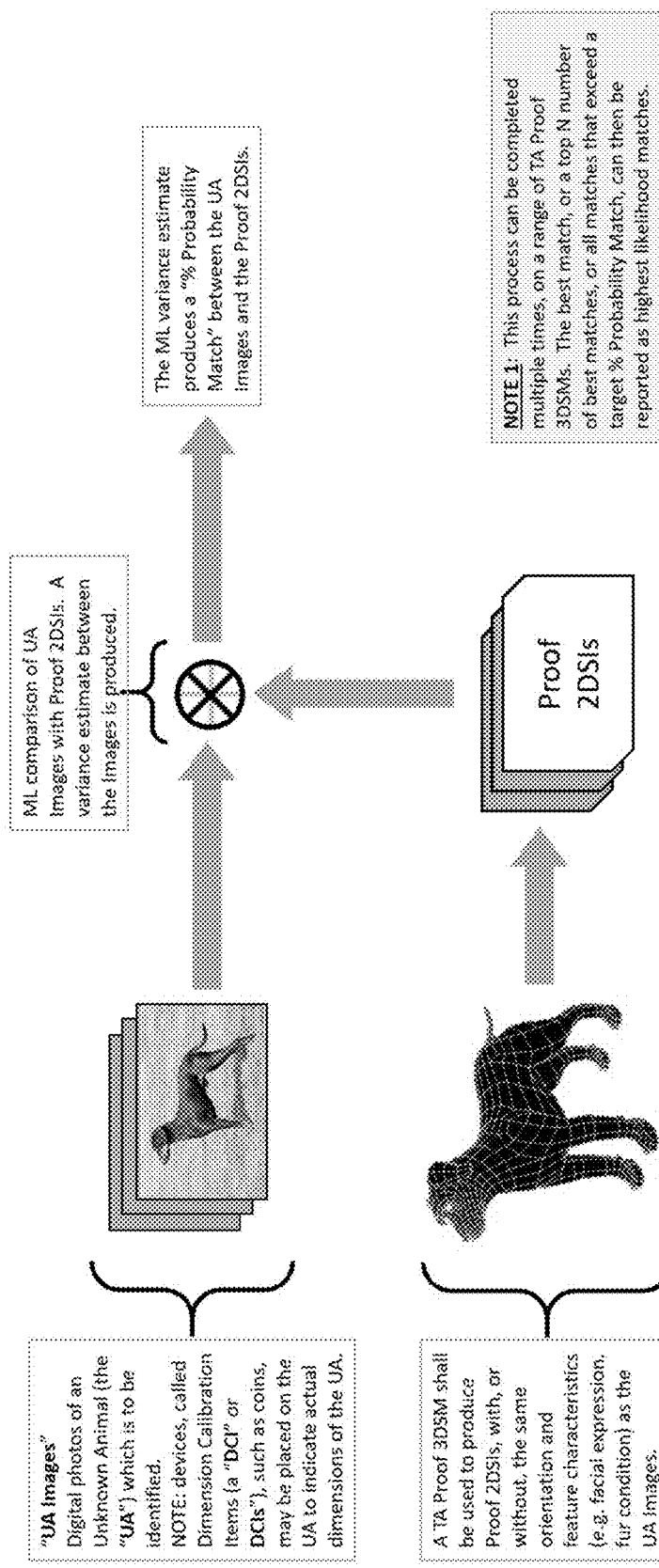
FIG. 18 shows a comparison of synthetic images generated from the model with images of an unidentified dog according to an exemplary embodiment.

FIG. 18 shows the comparison of the 2DSI proofs with the images of an UA according to an exemplary embodiment. This figure is a block diagram that illustrates the ML comparison of images (photo or video) of an unidentified animal (UA) with 2DSIs from a particular 3DSM, which may be based on the UA or any other animal. The ML process then produces a percentage probability match, or similar metric, between the UA images and the 2DSIs.

The user takes images or videos of the UA that needs to be identified. The UA images may be compared to a plurality of 3DSM proof previously generated. The user uploads the images and a first TA 3DSM proof is selected. The first 3DSM proof oriented to have the same orientation and feature characteristics as the UA images and the 2DSIs are generate for the first 3DSM proof. The 2DSI proofs are compared to the images of the UA and a variance is estimated between the produced images. The estimated variance produces a probability of match between the UA images and the proof 2DSIs. The procedure may be repeated for the plurality of 3DSM proofs. Matches that exceeds the target percent probability of match can then be reported as highest likelihood matches. In some embodiments, only the best match is reported. In other embodiments, a set number of best matches are reported.

The "Image Recognition from 3D Surface Model," is derivative from the processes and results described in baseline model generation process illustrated in FIG. 16, for example. However, the processes described herein could also utilize 3D surface models from any other source.

An exemplary advantage of some embodiments is that 2DSIs can be generated from a 3DSM, where the 3DSM is positioned in a manner which matches the position of an animal of interest as it appears in a photo or video. Furthermore, facial expressions or other morphological features (e.g. condition of hair or fur) can be reproduced in the 3DSM, and the resulting 2DSIs may be closer representations of the animal in a photo or video. The use of 3DSM and 2DSI images beneficially expands the functionality of image recognition opportunity for instances where new images of items might not match closely enough with reference images of the item, reducing the potential for successful ML image recognition.

Methods of image recognition from 3DSMs in some embodiment greatly expands the opportunity of a target animal (TA), or multiple TAs, to be successfully identified by any ML image recognition tool, from new images of the TA. Availability of a 3DSM with accurate surface texturing and coloration, combined with the ability to pose the 3DSM in any position and with any type of facial expression or other unique morphological expression, increases the likelihood of successful recognition during comparison of 2DSIs with new photo or video images of a TA. Such increased likelihood of successful recognition includes positive matches (e.g. when a new TA image is of the source animal for a particular 3DSI), and negative matches (e.g. when a new TA image is not that of the source animal for a particular 3DSI).

In addition to the utility of the 3DSM and 2DSIs for TA recognition using ML, such 3DSMs and 2DSIs can be used for direct inspection by humans for recognition of a TA.

Figure 19:
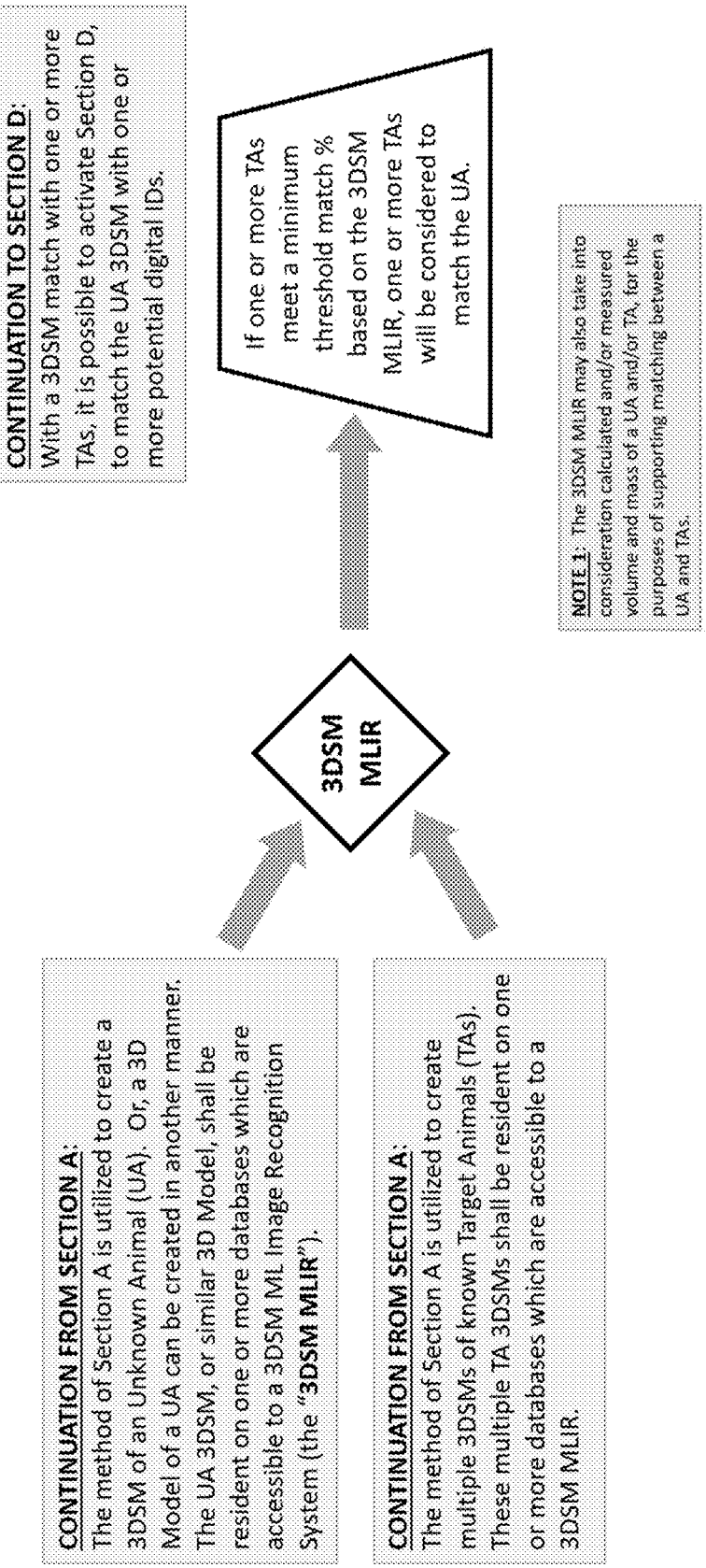
FIG. 19 shows a process for directly comparing and matching a model of a registered animal with an incoming model of an unknown animal without utilizing synthetic images according to an exemplary embodiment.

FIG. 19 shows 3DSM matching for animals according to an exemplary embodiment. The 3DSM proof of the TA can be directly matched to the 3DSM of the UA. The 3DSM may take the calculated volume and mass information into account for the purposes of supporting matching between the UA and the TA.

Figure 20:
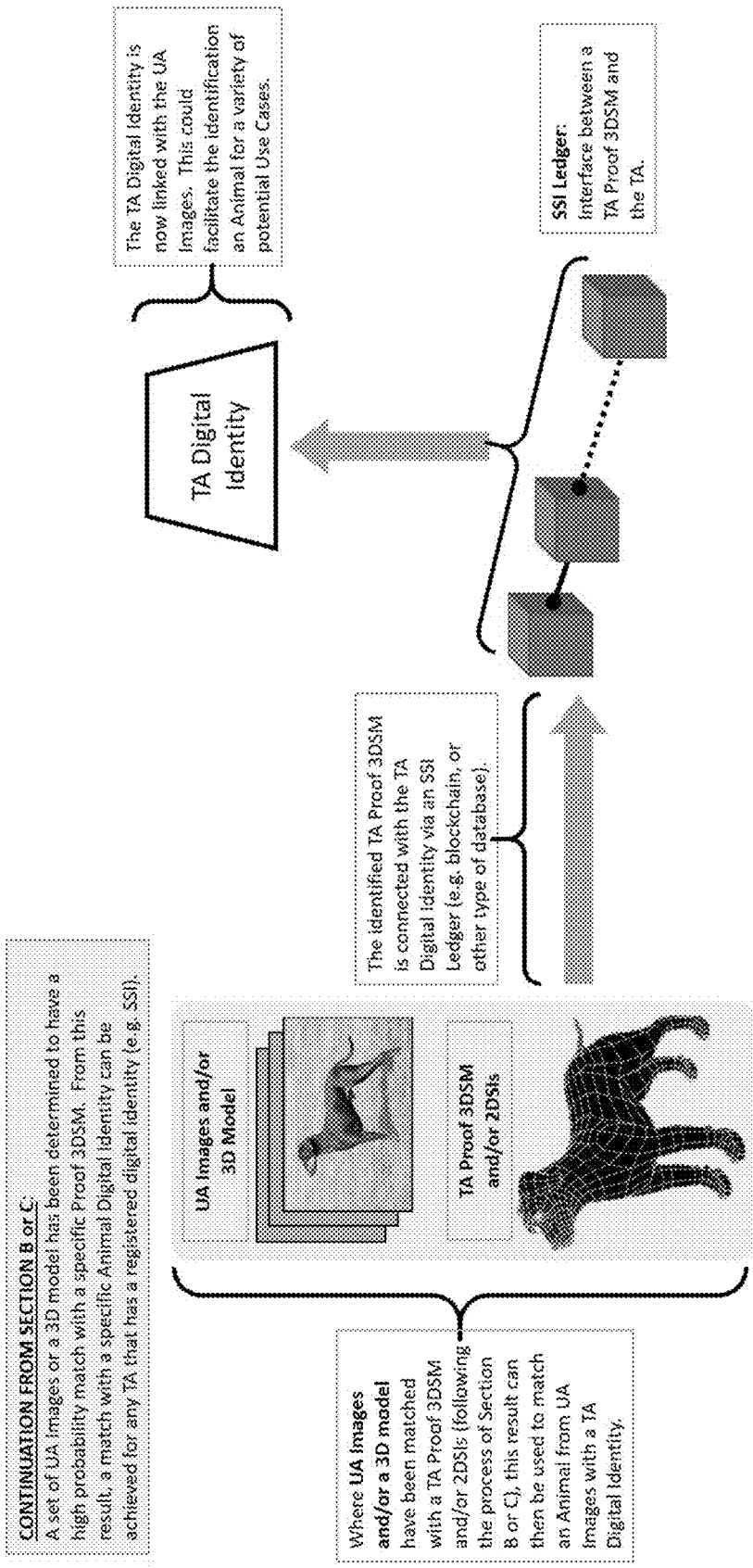
FIG. 20 shows an example of image recognition and identity matching of images of an unknown dog with a known dog according to an exemplary embodiment.

FIG. 20 shows image recognition and identity matching according to an exemplary embodiment. When a set of UA images or the 3DSM of the UA has been determined to have a high probability match with a specific TA proof 3DSM, the identified TA proof 3DSM is connected with the target animal digital ID via a digital ID ledger (e.g. block chain, or other type of database). When the TA digital identity is linked with the UA images, the TA digital ID facilitates the identification of the animal for a variety of potential use cases.

If a lost animal is found, it is often necessary for the person who finds the animal to take it to a shelter or call a shelter organization to request support to potentially reunite the animal with its owner/guardian. Even in regions with well-developed government licensing practices that require animals to wear physical tags that list owner/guardian contact information, such tags may not be on the animal, or they may be lost, when an animal goes missing. A low effort animal identification method, available to any person with a smart phone and internet access, greatly increases the probability that a person finding an animal will take time to identify it and contact its owner and increases the probability of a lost animal to be safely rehomed. The 3DSM biometric identification process described herein makes this process accessible to any person with a smart phone and internet access. Also, its functionality to simulate many conditions of the animal (i.e. its position/posture, fur condition) by adjusting the 3DSM to match the posture and condition of images of a found animal, increases the potential for successfully matching those images with a range of 3DSMs. This capability, for a product (i.e. a smart phone app), holds high appeal to animal owners/guardians who put great value (emotional and/or financial) in their animal.

Many cities, regional or national governments require that animals such as dogs and cats be formally registered with a government organization. The animal must then have some form of physical identification that demonstrates registration status, which also provides a method of connecting the animal and its owner/guardian. If this process is conducted via a web page or other physical documentation means, based only on a person's attestations, the accuracy of any information is not directly verified, and therefore the registration data may lack value and utility. If the process requires direct interaction between the animal, owner/guardian and some authority (i.e. veterinarian, government official, other), that process costs significant time and money for the owner and government organization. Any government organization that uses 3DSM identification methods, combined with digital identity with relevant credentials for the animal, will have a low cost of registration (similar to the simple web-based example above), but have a strong link for biometric identity and ability to confirm credentials. For example, if part of the registration requirement is that an animal must have a valid rabies vaccination, that credential can be confirmed via a connection to the relevant vaccination credential, which can easily be provided by the owner via the digital identity management software. Thus, the government organization will have the lowest cost registration process with a high level of confidence that registration can be accurately linked (biometrically) with the appropriate animal, along with any other necessary credentials. The animal owner/guardian can complete the registration process quickly via a smart phone app, or an enabled web site.

In any area of the world with homeless animal populations (typically dogs and cats), there are frequently programs for rabies vaccination and spaying/neutering of the homeless animals to reduce populations and minimize safety issues for the human society. Accurately and reliably identifying animals that have received vaccinations and/or spaying/neutering is necessary to achieve program goals and minimize the time and cost to capture an animal to confirm its identity. 3DSM identification methods described herein, along with ability to link a biometrically identified animal with a history of medical procedures, greatly simplifies and reduce the cost of that aspect of these programs. Furthermore, it is possible to complete 3DSM identification even when a dog is 2 m to 100 m away from an observer, depending on the type of photo/video equipment used. For instance, in some embodiments, only a basic smart phone camera is necessary to achieve identification results for a dog if it is 2 m to 5 m away from an observer. If the dog is further away, accurate 3DSM biometric identification at distances of 5 m to 100 m imaging equipment with capabilities beyond that of a simple smart phone can be utilized. For instance, one or more images of the UA taken from a digital camera (e.g., DSLR camera) may be imported into the software application as the UA images received at step 702, for example.

Currently, most trans-national travel for pets, or any animals being transported by humans, may require the animal to have a RFID microchip implanted, or some other sophisticated identification method requiring uncommon and expensive hardware to record and read biometric information (e.g. iris scanning) for an animal. For cases where an animal can be identified with high reliability with the 3DSM processes, it is possible for such animal to be approved to cross national borders with only photos or video of the animal being taken by officials at a border crossing point. As reliability and government acceptance of 3DSM identification methods grows, coupled with cryptographically secure credentials associated with an animals digital identity (i.e. vaccination and health records), travel preparation and the travel process for animals and their owners/guardians will be less costly and onerous—both to the animal owner/guardians, and the responsible government organizations. Furthermore, even for instance where governments may still require RFID chips, one or more of the 3DSM Biometric ID processes described can be a complimentary method of identification to improve accuracy and enable better border security for crossing points that may not be equipped with specialty RFID chip readers, iris scanners or other expensive and complex devices.

According to an exemplary embodiment, a system includes an identification system and an information database for linking an unidentified animal (UA) to a registered animal. A requester sends the media corresponding to the UA to the identification system. The UA images are used for determining an orientation and position of the UA. A selected 3DSM of the registered animal is reconfigured using a 3DSM generator by moving the movable joints of the 3DSM to have the same orientation and position as the UA images. A 2DSM generator is used to generate 2D synthetic images (2DSIs) of the selected 3DSM. The images of the unidentified animal are compared to the 2DSIs of the selected 3DSM. When a match probability exceeds a threshold probability, a match is reported to a requester. The requester can obtain permission from an owner to get access to the information pertaining to the UA.

Glossary and Definitions of Terms

2D Synthetic Image ("2DSI")

This is a two dimensional (2D) image derived from a 3DSM (see definition below) that is similar to a digital photo of an object (where the "object" would be the actual object correspond to the 3DSM, such as a real-life cat, dog, human, or other animal). A 2DSI can be created from any angle of view from a 2DSI, with the 3DSM posed in any possible position (e.g. sitting, standing, etc.), or with adjustments to other variably features (e.g. facial expression, hair/fur condition, skin pigmentation, etc.).

3D Surface Model ("3DSM")

This is a three dimensional (3D) digital model, derived from digital photos of an object (where the "object" may be any animal). The 3DSM may include any surface features of the object which are visible, or derivable, from digital photos which are provide for generation of the 3DSM. Surface features can include textures, coloration and any other distinctive features such as relative size of any portions of the object.

There are a variety of tools that facilitate the generating such models, including photogrammetry (see definition below). In some embodiments, the exact method by which the 3DSM is generated is different than described herein, as computational methods improve from year to year, and it is intended that best practices in 3D Surface Model generation should be utilized and updated from time to time as warranted by the needs of the use applications.

3D Gen-gin

The phrase "3D Gen-gin" stands for 3D generation engine. This represents one of multiple possible methods that may be applied to generate 3DSMs. These methods may include:
 a. Photogrammetry; [see references on page 3 of these definitions],
 b. Visual Object Networks (VON); [Jun-Yan Zhu, Zhoutong Zhang, Et al. Visual Object Networks: Image Generation with Disentangled 3D Representation, 32nd Conference on Neural Information Processing Systems. NeurIPS 2018, Montréal, Canada],
 c. Manual construction utilizing software such as Adobe Photoshop, AutoDesk Maya, etc.,
 d. Custom developed, proprietary, commercial or open source Machine Learning/Deep Learning neural network tools,
 e. Use of various tools, such as laser scanning, cameras with IR dot pattern generators that facilitate depth/position mapping, time of flight cameras, etc.—all of which may then utilize computer post-processing methods for optimizing a 3D model,
 f. etc.

Animal

Any member of the Kingdom Animalia (including humans).

Computer Generated Images ("CGI")

Computer-generated images/computer-generated imagery: digital graphics used in visual media, often in the form of 3D animation.
 (ref: https://www.dictionary.com/browse/cgi)

Digital Identity

A digital identity is information on an entity used by computer systems to represent an external agent. That agent may be a person, organization, application, or device. ISO/IEC 24760-1 defines identity as "set of attributes related to an entity". The digital identity may include SSI.
 (ref: https://en.wikipedia.org/wiki/Digital_identity)

Entity

An Animal, organization, device, document, software code, river, discrete body of land, or other physical or non-physical thing identified as a unique item.

Merriam-Webster definition: 1a: being, existence, especially: independent, separate, or self-contained existence; 1b: the existence of a thing as contrasted with its attributes; 2: something that has separate and distinct existence and objective or conceptual reality; 3: an organization (such as a business or governmental unit) that has an identity separate from those of its members.

Image Recognition

Image recognition is a term for computer technologies that can recognize certain people, Animals, objects or other targeted subjects through the use of algorithms and machine learning concepts. The term "image recognition" is connected to "computer vision," which is an overarching label for the process of training computers to "see" like humans, and "image processing," which is a catch-all term for computers doing intensive work on image data.

Image recognition is done in many different ways, but many of the top techniques involve the use of convolutional neural networks to filter images through a series of artificial neuron layers. The convolutional neural network was specifically set up for image recognition and similar image processing.
 (ref: https://www.techopedia.com/definition/33499/image-recognition)

Machine Learning ("ML")

ML is the scientific study of algorithms and statistical models that computer systems use to effectively perform a specific task without using explicit instructions, relying on patterns and inference instead. It is seen as a subset of artificial intelligence. Machine learning algorithms build a mathematical model of sample data, known as "training data", in order to make predictions or decisions without being explicitly programmed to perform the task. Machine learning algorithms are used in a wide variety of applications, such as email filtering, detection of network intruders, and computer vision, where it is infeasible to develop an algorithm of specific instructions for performing the task.
 (ref: https://en.wikipedia.org/wiki/Machine_learning)

ML may be utilized from 3rd party providers (e.g. AWS, Google, Baidu, etc.), or it may be bespoke systems developed for us, or it could be a combination of ML from 3rd party providers and bespoke systems.

Photogrammetry

Photogrammetry is the art and science of making measurements from photographs, especially for recovering the exact positions of surface points. Photogrammetry is as old as modern photography, dating to the mid-19th century and in the simplest example, the distance between two points that lie on a plane parallel to the photographic image plane, can be determined by measuring their distance on the image, if the scale (s) of the image is known.

Photogrammetric analysis may be applied to one photograph, or may use high-speed photography and remote sensing to detect, measure and record complex 2-D and 3-D motion fields by feeding measurements and imagery analysis into computational models in an attempt to successively estimate, with increasing accuracy, the actual, 3-D relative motions.

(ref: https://en.wikipedia.org/wiki/Photogrammetry)

Self-Sovereign Identity (or, SSI)

An identity system architecture based on the core principle that identity owners have the right to permanently control one or more identifiers together with the usage of the associated identity data. An SSI is a form of digital identity.

SSI Ledger

A distributed, continuously-replicated global cryptographic database, which may be a type of blockchain or any other form of database. An SSI ledger allows any entity with an SSI to securely access data, or send data, which is linked (cryptographically or otherwise) with said entity's SSI.

Each of the various documents and references cited in the glossary and elsewhere in this detailed description are incorporated herein by reference.

Although the invention has been described in connection with preferred embodiments, it should be understood that various modifications, additions and alterations may be made to the invention by one skilled in the art without departing from the spirit and scope of the invention.

For instance, although the above descriptions have focused on registering and identifying animals, similar techniques as described herein may also be utilized to register and identify any object. A type of the target object may be automatically (or manually) identified and then a corresponding model may be selected. Moveable parts of the model may be adjusted to match the position and orientation of corresponding movable parts of the incoming images. For instance, if the target object is an animal, the moveable part(s) of the model of the animal may correspond to a joint or muscle-controlled body part of the animal. In another example, if the target object is an inanimate object such as a sailboat, the moveable part(s) of the model of the sailboat may correspond to sail or rudder positions, for example.

In some embodiments, the 3DSM of the TA are converted into a standard pose after the 3DSM generator generates the 3DSM based on the images received. The UA images are also converted into the standard pose. This greatly simplifies the comparison process. In some embodiments, the model template does not have any moveable parts.

In some embodiments, the identification system may be implemented completely or partially on the user device. The 3DSM generator, the 2DSI generator, the storage device, the messaging service, the evaluation server, and the shortlist server may be implemented locally on the user device or on a cloud-based server.

The above-described flowcharts and functionality may be implemented by software executed by one or more processors operating pursuant to instructions stored on a tangible computer-readable medium such as a storage device to perform the above-described functions of any or all aspects of the access controller. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that becomes the identification system or any of the above-described components as a result of executing the instructions.

In other embodiments, rather than being software modules executed by one or more processors, the above-described flowcharts and functionality may be implemented as hardware modules configured to perform the above-described functions. Examples of hardware modules include combinations of logic gates, integrated circuits, field programmable gate arrays, and application specific integrated circuits, and other analog and digital circuit designs.

Unless otherwise specified, features described may be implemented in hardware or software according to different design requirements. In addition to a dedicated physical computing device, the word "server" may also mean a service daemon on a single computer, virtual computer, a cloud server, or shared physical computer or computers, for example. All combinations and permutations of the above described features and embodiments may be utilized in conjunction with the invention.

What is claimed is:

1. An identification system for matching a model to a target object, the identification system comprising:
   one or more processors;
   a storage device; and
   a communication interface;
   wherein by the one or more processors executing software instructions loaded from the storage device, the one or more processors are configured to:
      receive an incoming image via the communication interface;
      identify the target object in the incoming image;
      determine a classification of the target object;
      retrieve the model of the target object based on the classification;
      select a movable part of the model;
      identify a configuration of a section of the target object in the incoming image that corresponds to the movable part of the model;
      configure the movable part of the model to match the configuration of the section of the target object in the incoming image;
      generate a synthetic image of the model with the movable part configured to match the section of the target object in the incoming image;
      compare the synthetic image with the incoming image to determine a variance;
      compare the variance to a threshold variance; and
      in response to the variance being below the threshold variance, determine that the synthetic image matches the incoming image and store an indication that the model matches the target object.

2. The identification system of claim 1, wherein the model is a 3DSM (3-dimensional surface model) of the target object.

3. The identification system of claim 1, wherein the one or more processors are configured to receive a wireframe from the communication interface and utilize the wireframe to perform the classification of the target object.

4. The identification system of claim 1, wherein the one or more processors are configured to send the incoming image and the synthetic image to a remote server for determining the variance.

5. The identification system of claim 1, wherein the one or more processors are configured to:
   determine characteristics of the target object using the incoming image; and
   create a shortlist of models utilizing the characteristics of the target object.

6. The identification system of claim 1, wherein the one or more processors are configured to identify the target object in the incoming image by performing background and foreground segmentations.

7. The identification system of claim 1, wherein the target object is an animal.

8. The identification system of claim 1, wherein the one or more processors are configured to configure a plurality of movable parts of model.

9. The identification system of claim 1, wherein the one or more processors are configured to detect an orientation of the target object in the incoming image and change the orientation of the model based on the orientation of the target object.

10. The identification system of claim 1, wherein the classification of the target object is determined using characteristics of the target object.

11. The identification system of claim 1, wherein the classification of the target object is determined using a type of the target object.

12. The identification of system of claim 1, wherein the one or more processors are configured to determine a condition of the target object.

13. An identification system for matching a model to a target object, the identification system comprising:
    one or more processors;
    a storage device; and
    a communication interface;
    wherein by the one or more processors executing software instructions loaded from the storage device, the one or more processors are configured to:
        receive an incoming image via the communication interface;
        identify the target object in the incoming image;
        determine a classification of the target object;
        retrieve the model of the target object based on the classification;
        select a movable part of the model;
        identify a configuration of a section of the target object in the incoming image that corresponds to the movable part of the model;
        configure the movable part of the model to match the configuration of the section of the target object in the incoming image;
        generate a synthetic image of the model with the movable part configured to match the section of the target object in the incoming image;
        receive the incoming image of the target object with a known identifier;
        compare the synthetic image and the incoming image to determine a variance;
        compare the variance to a threshold variance;
        while the variance exceeds the threshold variance, adjust the model according to the variance;
        in response to the variance being below the threshold variance, determine that the synthetic image matches the incoming image and store the model matching the target object as a baseline model; and
        associate the known identifier to the baseline model.

14. The identification system of claim 13, wherein the one or more processors are configured to:
    receive a new incoming image with the known identifier; and
    update the baseline model using the new image.

15. The identification system of claim 13, wherein the model is a 3DSM (3-dimensional surface model) of the target object.

16. The identification system of claim 13, wherein the one or more processors are configured to send the incoming image and the synthetic image to a remote server for determining the variance.

17. An identification system for matching a model to a target object, the identification system comprising:
    one or more processors;
    a storage device; and
    a communication interface;
    wherein by the one or more processors executing software instructions loaded from the storage device, the one or more processors are configured to:
        receive an incoming image via the communication interface;
        identify the target object in the incoming image;
        determine a classification of the target object;
        retrieve the model of the target object based on the classification;
        select a movable part of the model;
        identify a configuration of a section of the target object in the incoming image that corresponds to the movable part of the model;
        configure the movable part of the model to match the configuration of the section of the target object in the incoming image;
        generate a synthetic image of the model with the movable part configured to match the section of the target object in the incoming image;
        compare the synthetic image with the incoming image to determine whether the synthetic image matches the incoming image;
        retrieve a list of models of the target object based on the classification;
        compare the synthetic image of each model included in the list of models to the incoming image to determine a variance;
        compare the variance to a threshold variance;
        in response to the variance being below the threshold variance, determine a digital identity linked to the model; and
        store the digital identity of the model as a potential match.

18. The identification system of claim 17, the one or more processors are configured to:
    report the potential match to a first user;
    receive a first request from the first user to obtain identity information pertaining to the potential match;
    send a second request to an information database to identify a second user, where the second user is associated with the potential match;
    send a third request to the second user to gain access to the information database;
    receive an access granted notification from the second user;
    request the identity information pertaining to the potential match from the information database;
    receive the identity information from the information database; and
    send the identity information to the first user.

19. The identification system of claim 5, wherein the model is a 3DSM (3-dimensional surface model) of the target object.

20. The identification system of claim 5, wherein the one or more processors are configured to send the incoming image and the synthetic image to a remote server for determining the variance.

* * * * *